(12) United States Patent
Wang et al.

(10) Patent No.: US 12,136,967 B2
(45) Date of Patent: Nov. 5, 2024

(54) USER-EQUIPMENT-COORDINATION SET FOR A WIRELESS NETWORK

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 385 days.

(21) Appl. No.: 17/311,996

(22) PCT Filed: Dec. 23, 2019

(86) PCT No.: PCT/US2019/068265
§ 371 (c)(1),
(2) Date: Jun. 8, 2021

(87) PCT Pub. No.: WO2020/139811
PCT Pub. Date: Jul. 2, 2020

(65) Prior Publication Data
US 2022/0006493 A1 Jan. 6, 2022

Related U.S. Application Data

(60) Provisional application No. 62/785,949, filed on Dec. 28, 2018.

(51) Int. Cl.
*H04W 4/00* (2018.01)
*H04B 7/024* (2017.01)
*H04B 7/06* (2006.01)

(52) U.S. Cl.
CPC ........... *H04B 7/024* (2013.01); *H04B 7/0617* (2013.01)

(58) Field of Classification Search
CPC .............................. H04B 7/0617; H04W 4/08
See application file for complete search history.

(56) References Cited

U.S. PATENT DOCUMENTS

| 6,038,448 A | 3/2000 | Chheda et al. |
| 6,665,521 B1 | 12/2003 | Gorday et al. |

(Continued)

FOREIGN PATENT DOCUMENTS

| CN | 101764634 | 6/2010 |
| CN | 101867451 | 10/2010 |

(Continued)

OTHER PUBLICATIONS

"Final Office Action", U.S. Appl. No. 16/969,105, filed Oct. 11, 2022, 9 pages.

(Continued)

*Primary Examiner* — Shantell L Heiber
(74) *Attorney, Agent, or Firm* — Colby Nipper PLLC

(57) ABSTRACT

This document describes techniques and apparatuses for a user equipment (UE)-coordination set for a wireless network. In aspects, a base station specifies a set of UEs to form a UE-coordination set for joint transmission and reception of data intended for a target UE within the UE-coordination set. The base station selects one of the UEs within the UE-coordination set to act as a coordinating UE for the UE-coordination set and transmits a request message that directs the coordinating UE to coordinate the joint transmission and reception of the data intended for the target UE. Then, the base station transmits a downlink signal to each UE within the UE-coordination set. Each UE within the UE-coordination set demodulates and samples the downlink signal and then forwards the samples to the coordinating UE, which combines the samples and processes the combined samples to provide decoded data.

14 Claims, 7 Drawing Sheets

(56) References Cited

U.S. PATENT DOCUMENTS

| | | |
|---|---|---|
| 6,898,430 B1 | 5/2005 | Liberti et al. |
| 8,023,463 B2 | 9/2011 | Dick et al. |
| 8,315,629 B2 | 11/2012 | Pamp et al. |
| 8,483,184 B2 | 7/2013 | Yokoyama et al. |
| 8,559,992 B2 | 10/2013 | Larsson et al. |
| 8,665,806 B2 | 3/2014 | Wang et al. |
| 8,706,156 B2 | 4/2014 | Han et al. |
| 8,989,125 B1 | 3/2015 | Marupaduga et al. |
| 9,008,678 B2 | 4/2015 | Schoenerstedt |
| 9,036,613 B2 * | 5/2015 | Vleugels ............ H04W 52/0209 370/334 |
| 9,100,095 B2 | 8/2015 | Mantri |
| 9,210,550 B2 | 12/2015 | Koc et al. |
| 9,253,783 B2 | 2/2016 | Wang et al. |
| 9,271,194 B2 | 2/2016 | Lu et al. |
| 9,344,159 B2 | 5/2016 | Zhuang |
| 9,374,772 B2 | 6/2016 | Daoud |
| 9,380,533 B2 | 6/2016 | Chung et al. |
| 9,674,863 B2 | 6/2017 | Cheng et al. |
| 9,699,731 B2 | 7/2017 | Khoryaev et al. |
| 9,743,329 B2 | 8/2017 | Xiao et al. |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,178,696 B2 | 1/2019 | Cheng et al. |
| 10,201,003 B2 | 2/2019 | Guo et al. |
| 10,218,422 B2 | 2/2019 | Raghavan et al. |
| 10,313,950 B2 | 6/2019 | Choi et al. |
| 10,321,414 B2 | 6/2019 | Guo et al. |
| 10,412,691 B1 | 9/2019 | Marupaduga et al. |
| 10,542,556 B2 | 1/2020 | Mallik |
| 10,834,645 B2 | 11/2020 | Wang et al. |
| 10,893,572 B2 | 1/2021 | Wang et al. |
| 11,134,092 B2 | 9/2021 | Michael et al. |
| 11,164,479 B1 | 11/2021 | Madison |
| 11,350,439 B2 | 5/2022 | Wang et al. |
| 11,503,610 B2 | 11/2022 | Wang et al. |
| 11,638,272 B2 | 4/2023 | Wang et al. |
| 11,641,566 B2 | 5/2023 | Wang et al. |
| 11,889,322 B2 | 1/2024 | Wang et al. |
| 11,956,850 B2 | 4/2024 | Wang et al. |
| 2003/0002460 A1 | 1/2003 | English |
| 2004/0203973 A1 | 10/2004 | Khan |
| 2004/0233858 A1 | 11/2004 | Karaoguz |
| 2006/0013185 A1 | 1/2006 | Seo et al. |
| 2006/0116156 A1 | 6/2006 | Haseba et al. |
| 2006/0128312 A1 | 6/2006 | Declerck et al. |
| 2006/0203731 A1 | 9/2006 | Tiedemann et al. |
| 2007/0223423 A1 | 9/2007 | Kim et al. |
| 2009/0175214 A1 | 7/2009 | Sfar et al. |
| 2009/0176494 A1 | 7/2009 | Lee et al. |
| 2010/0027487 A1 | 2/2010 | Ihm et al. |
| 2010/0103983 A1 | 4/2010 | Wang et al. |
| 2010/0118752 A1 | 5/2010 | Suzuki et al. |
| 2010/0142462 A1 | 6/2010 | Wang et al. |
| 2010/0173660 A1 | 7/2010 | Liu et al. |
| 2010/0210246 A1 | 8/2010 | Yang et al. |
| 2010/0273492 A1 | 10/2010 | Liu et al. |
| 2010/0296471 A1 | 11/2010 | Heo et al. |
| 2010/0297993 A1 | 11/2010 | Heo et al. |
| 2011/0080893 A1 | 4/2011 | Fong et al. |
| 2011/0096751 A1 | 4/2011 | Ma et al. |
| 2011/0124294 A1 | 5/2011 | Dwyer et al. |
| 2011/0158117 A1 | 6/2011 | Ho et al. |
| 2011/0228666 A1 | 9/2011 | Barbieri et al. |
| 2011/0281585 A1 | 11/2011 | Kwon et al. |
| 2012/0087273 A1 | 4/2012 | Koo et al. |
| 2012/0102409 A1 | 4/2012 | Fan et al. |
| 2012/0120821 A1 | 5/2012 | Kazmi et al. |
| 2012/0157139 A1 | 6/2012 | Noh et al. |
| 2012/0178462 A1 | 7/2012 | Kim |
| 2012/0218968 A1 | 8/2012 | Kim et al. |
| 2012/0236735 A1 | 9/2012 | Nory et al. |
| 2012/0264443 A1 | 10/2012 | Ng et al. |
| 2013/0034136 A1 | 2/2013 | Park et al. |
| 2013/0039287 A1 | 2/2013 | Rayavarapu et al. |
| 2013/0041954 A1 | 2/2013 | Kim et al. |
| 2013/0053045 A1 | 2/2013 | Chuang |
| 2013/0053079 A1 | 2/2013 | Kwun et al. |
| 2013/0089058 A1 | 4/2013 | Yang et al. |
| 2013/0107848 A1 | 5/2013 | Kang et al. |
| 2013/0122918 A1 | 5/2013 | Boley et al. |
| 2013/0130684 A1 | 5/2013 | Gomes et al. |
| 2013/0138817 A1 | 5/2013 | Zhang et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0242787 A1 | 9/2013 | Sun et al. |
| 2013/0244682 A1 | 9/2013 | Schoenerstedt |
| 2013/0322276 A1 | 12/2013 | Pelletier et al. |
| 2013/0329711 A1 | 12/2013 | Seo et al. |
| 2014/0010131 A1 | 1/2014 | Gaal et al. |
| 2014/0029591 A1 | 1/2014 | Anderson |
| 2014/0112184 A1 | 4/2014 | Chai |
| 2014/0127991 A1 | 5/2014 | Lim et al. |
| 2014/0148168 A1 | 5/2014 | Aoyagi et al. |
| 2014/0169201 A1 | 6/2014 | Tamura et al. |
| 2014/0169261 A1 | 6/2014 | Ming et al. |
| 2014/0177456 A1 | 6/2014 | Boudreau et al. |
| 2014/0226575 A1 | 8/2014 | Davydov et al. |
| 2014/0269632 A1 | 9/2014 | Blankenship et al. |
| 2014/0274081 A1 | 9/2014 | Comeau et al. |
| 2014/0287759 A1 | 9/2014 | Purohit |
| 2014/0321433 A1 | 10/2014 | Xiao et al. |
| 2014/0348104 A1 | 11/2014 | Morita |
| 2014/0376478 A1 | 12/2014 | Morita |
| 2015/0038083 A1 * | 2/2015 | Patro ..................... H04W 84/20 455/41.2 |
| 2015/0043390 A1 | 2/2015 | Wang et al. |
| 2015/0065148 A1 * | 3/2015 | De Pasquale ......... H04W 48/16 455/445 |
| 2015/0098397 A1 | 4/2015 | Damnjanovic et al. |
| 2015/0110040 A1 | 4/2015 | Zhao |
| 2015/0139197 A1 | 5/2015 | He et al. |
| 2015/0139203 A1 | 5/2015 | Miryala et al. |
| 2015/0146680 A1 | 5/2015 | Luo et al. |
| 2015/0163822 A1 | 6/2015 | Guo et al. |
| 2015/0195795 A1 | 7/2015 | Loehr et al. |
| 2015/0244429 A1 | 8/2015 | Zhang et al. |
| 2015/0244489 A1 | 8/2015 | Wang |
| 2015/0288427 A1 | 10/2015 | Wang et al. |
| 2015/0326282 A1 | 11/2015 | Futaki |
| 2015/0358860 A1 | 12/2015 | Lu et al. |
| 2015/0373730 A1 | 12/2015 | Fujishiro et al. |
| 2015/0382142 A1 | 12/2015 | Kim et al. |
| 2016/0007138 A1 * | 1/2016 | Palanisamy ............ H04W 4/08 455/41.2 |
| 2016/0021526 A1 | 1/2016 | Niu et al. |
| 2016/0021623 A1 | 1/2016 | Guo et al. |
| 2016/0028448 A1 | 1/2016 | Park et al. |
| 2016/0037511 A1 | 2/2016 | Mncze et al. |
| 2016/0044634 A1 | 2/2016 | Seo et al. |
| 2016/0057604 A1 | 2/2016 | Luo et al. |
| 2016/0057663 A1 | 2/2016 | Teyeb et al. |
| 2016/0088642 A1 | 3/2016 | Yang et al. |
| 2016/0128123 A1 * | 5/2016 | Li ......................... H04B 7/024 370/252 |
| 2016/0143074 A1 | 5/2016 | Wietfeldt et al. |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0227463 A1 | 8/2016 | Baligh et al. |
| 2016/0234841 A1 | 8/2016 | Pao et al. |
| 2016/0323832 A1 | 11/2016 | Love et al. |
| 2016/0374026 A1 | 12/2016 | Dinan |
| 2016/0381630 A1 | 12/2016 | Krishnamoorthy et al. |
| 2017/0070931 A1 | 3/2017 | Huang et al. |
| 2017/0078333 A1 | 3/2017 | Tevlin |
| 2017/0086061 A1 | 3/2017 | Huang et al. |
| 2017/0105147 A1 | 4/2017 | Jiang et al. |
| 2017/0148173 A1 | 5/2017 | Yang |
| 2017/0164252 A1 | 6/2017 | Chaudhuri et al. |
| 2017/0188206 A1 | 6/2017 | Schmitt et al. |

(56) References Cited

U.S. PATENT DOCUMENTS

| | | |
|---|---|---|
| 2017/0188406 A1 | 6/2017 | Baligh et al. |
| 2017/0230986 A1 | 8/2017 | Moon et al. |
| 2017/0238271 A1 | 8/2017 | Viorel et al. |
| 2017/0250786 A1 | 8/2017 | Better et al. |
| 2017/0265227 A1* | 9/2017 | Wang .................... H04W 76/11 |
| 2017/0290030 A1 | 10/2017 | Wang et al. |
| 2017/0332389 A1 | 11/2017 | Sun et al. |
| 2017/0339530 A1 | 11/2017 | Maaref |
| 2017/0359759 A1 | 12/2017 | Brown et al. |
| 2018/0013533 A1 | 1/2018 | Yang et al. |
| 2018/0020444 A1 | 1/2018 | Lee et al. |
| 2018/0027393 A1 | 1/2018 | Yang et al. |
| 2018/0062770 A1* | 3/2018 | Reial .................... H04B 7/0695 |
| 2018/0115932 A1 | 4/2018 | Gomes et al. |
| 2018/0145805 A1 | 5/2018 | Maaref |
| 2018/0146471 A1 | 5/2018 | Ku et al. |
| 2018/0152949 A1 | 5/2018 | Guo et al. |
| 2018/0152951 A1 | 5/2018 | Zhuang et al. |
| 2018/0184386 A1 | 6/2018 | Heo et al. |
| 2018/0213450 A1 | 7/2018 | Futaki et al. |
| 2018/0220403 A1 | 8/2018 | Wilson et al. |
| 2018/0235020 A1 | 8/2018 | Maaref |
| 2018/0249483 A1 | 8/2018 | Chen |
| 2018/0254797 A1 | 9/2018 | Amini et al. |
| 2018/0317130 A1 | 11/2018 | Jin et al. |
| 2018/0352511 A1 | 12/2018 | Martin et al. |
| 2019/0007844 A1 | 1/2019 | Müller et al. |
| 2019/0028348 A1 | 1/2019 | Chai |
| 2019/0037560 A1 | 1/2019 | Huang et al. |
| 2019/0053235 A1 | 2/2019 | Novlan et al. |
| 2019/0075581 A1 | 3/2019 | Salem et al. |
| 2019/0075604 A1 | 3/2019 | Wang et al. |
| 2019/0081657 A1 | 3/2019 | Zeng et al. |
| 2019/0082331 A1 | 3/2019 | Raghavan et al. |
| 2019/0082371 A1 | 3/2019 | Burt et al. |
| 2019/0082428 A1 | 3/2019 | Maaref et al. |
| 2019/0110318 A1 | 4/2019 | Zhang et al. |
| 2019/0132882 A1 | 5/2019 | Li et al. |
| 2019/0158909 A1 | 5/2019 | Kulkarni et al. |
| 2019/0165843 A1 | 5/2019 | Wu et al. |
| 2019/0174346 A1 | 6/2019 | Murray et al. |
| 2019/0174472 A1 | 6/2019 | Lee et al. |
| 2019/0208539 A1 | 7/2019 | Christoffersson et al. |
| 2019/0215048 A1 | 7/2019 | Cirik et al. |
| 2019/0253106 A1 | 8/2019 | Raghavan et al. |
| 2019/0261443 A1 | 8/2019 | Baligh et al. |
| 2019/0312616 A1 | 10/2019 | Christoffersson et al. |
| 2019/0363843 A1 | 11/2019 | Gordaychik |
| 2020/0015192 A1 | 1/2020 | Chun |
| 2020/0022043 A1 | 1/2020 | Pelletier et al. |
| 2020/0022174 A1 | 1/2020 | Karaki et al. |
| 2020/0037119 A1 | 1/2020 | Yang |
| 2020/0059802 A1 | 2/2020 | Singh |
| 2020/0092685 A1 | 3/2020 | Fehrenbach et al. |
| 2020/0120649 A1 | 4/2020 | Nimbalker et al. |
| 2020/0137591 A1 | 4/2020 | Smith et al. |
| 2020/0137754 A1 | 4/2020 | Kim et al. |
| 2020/0154442 A1 | 5/2020 | Zhou |
| 2020/0178131 A1 | 6/2020 | Wang et al. |
| 2020/0187281 A1 | 6/2020 | Wang et al. |
| 2020/0196388 A1 | 6/2020 | Zhang et al. |
| 2020/0322962 A1 | 10/2020 | Wang et al. |
| 2020/0329503 A1 | 10/2020 | Da Silva et al. |
| 2020/0374970 A1 | 11/2020 | Wang et al. |
| 2020/0396763 A1 | 12/2020 | Lee et al. |
| 2021/0028978 A1 | 1/2021 | Zhou et al. |
| 2021/0029516 A1 | 1/2021 | Wang et al. |
| 2021/0054964 A1 | 3/2021 | Wang et al. |
| 2021/0160850 A1 | 5/2021 | Akkarakaran et al. |
| 2021/0321419 A1 | 10/2021 | Li et al. |
| 2021/0345358 A1 | 11/2021 | Wang et al. |
| 2021/0345381 A1 | 11/2021 | Wang et al. |
| 2021/0385903 A1 | 12/2021 | Wang et al. |
| 2021/0391897 A1 | 12/2021 | Wang et al. |
| 2022/0030414 A1 | 1/2022 | Wang et al. |
| 2022/0038985 A1 | 2/2022 | Deeno et al. |
| 2022/0039160 A1 | 2/2022 | Wang et al. |
| 2022/0052745 A1 | 2/2022 | Li |
| 2022/0086653 A1 | 3/2022 | Wang et al. |
| 2022/0141676 A1 | 5/2022 | Wang et al. |
| 2022/0191967 A1 | 6/2022 | Wang et al. |
| 2022/0394725 A1 | 12/2022 | Wang et al. |

FOREIGN PATENT DOCUMENTS

| | | | |
|---|---|---|---|
| CN | 102474743 | 5/2012 | |
| CN | 102577150 A | 7/2012 | |
| CN | 102595429 | 7/2012 | |
| CN | 102638297 | 8/2012 | |
| CN | 103313197 | 9/2013 | |
| CN | 103858475 A | 6/2014 | |
| CN | 103959672 | 7/2014 | |
| CN | 104067660 | 9/2014 | |
| CN | 104394534 A | 3/2015 | |
| CN | 104429142 | 3/2015 | |
| CN | 104641570 A | 5/2015 | |
| CN | 104756425 | 7/2015 | |
| CN | 104885391 | 9/2015 | |
| CN | 106304348 | 1/2017 | |
| CN | 107135490 | 9/2017 | |
| CN | 107211271 | 9/2017 | |
| CN | 107211404 | 9/2017 | |
| CN | 107736048 | 2/2018 | |
| CN | 107872889 | 4/2018 | |
| CN | 109246708 | 1/2019 | |
| CN | 109314561 A | 2/2019 | |
| CN | 109417409 A | 3/2019 | |
| EP | 2809104 | 12/2014 | |
| EP | 2953393 | 12/2015 | |
| EP | 3282786 | 2/2018 | |
| EP | 3425936 | 1/2019 | |
| GB | 2502603 | 12/2013 | |
| GB | 2562109 | 11/2018 | |
| KR | 20080089457 | 10/2008 | |
| KR | 20090118058 | 11/2009 | |
| WO | 0237771 | 5/2002 | |
| WO | 2008147654 | 12/2008 | |
| WO | 2011140715 | 11/2011 | |
| WO | 2012114151 | 8/2012 | |
| WO | 2013057047 | 4/2013 | |
| WO | 2013091229 | 6/2013 | |
| WO | 2014074919 | 5/2014 | |
| WO | 2014165086 | 10/2014 | |
| WO | 2014179958 | 11/2014 | |
| WO | 2015074270 | 5/2015 | |
| WO | 2015123405 | 8/2015 | |
| WO | 2015163798 | 10/2015 | |
| WO | 2016045745 | 3/2016 | |
| WO | 2016081375 | 5/2016 | |
| WO | 2016191091 | 12/2016 | |
| WO | 2017023785 | 2/2017 | |
| WO | 2017117253 | 7/2017 | |
| WO | 2017117340 | 7/2017 | |
| WO | 2017148173 | 9/2017 | |
| WO | 2018010818 | 1/2018 | |
| WO | WO-2018010818 A1 * | 1/2018 | ............ H04B 7/026 |
| WO | 2016163206 | 2/2018 | |
| WO | 2018020015 | 2/2018 | |
| WO | 2018031770 | 2/2018 | |
| WO | 2018044392 A | 3/2018 | |
| WO | 2018073485 | 4/2018 | |
| WO | 2018130115 | 7/2018 | |
| WO | 2018169343 | 9/2018 | |
| WO | 2018192699 | 10/2018 | |
| WO | 2018202797 | 11/2018 | |
| WO | 2018202798 | 11/2018 | |
| WO | 2019001039 | 1/2019 | |
| WO | 2019016141 | 1/2019 | |
| WO | 2019038700 | 2/2019 | |
| WO | 2018025789 | 5/2019 | |
| WO | 2020112680 | 6/2020 | |
| WO | 2020113010 | 6/2020 | |
| WO | 2020117558 | 6/2020 | |
| WO | 2020139811 | 7/2020 | |

(56) References Cited

FOREIGN PATENT DOCUMENTS

| WO | 2020142532 | 7/2020 |
|---|---|---|
| WO | 2020159773 | 8/2020 |
| WO | 2020172022 | 8/2020 |
| WO | 2020172372 | 8/2020 |
| WO | 2020186097 | 9/2020 |
| WO | 2020223010 | 11/2020 |
| WO | 2020236429 | 11/2020 |
| WO | 2021002859 | 1/2021 |
| WO | 2021015774 | 1/2021 |
| WO | 2021029879 | 2/2021 |
| WO | 2021054963 | 3/2021 |
| WO | 2021054964 | 3/2021 |
| WO | 2021080666 | 4/2021 |
| WO | 2021159491 | 8/2021 |

OTHER PUBLICATIONS

"Foreign Office Action", IN Application No. 202247022717, Aug. 16, 2022, 7 pages.
"Foreign Office Action", CA Application No. 3,127,384, Sep. 27, 2022, 4 pages.
"Notice of Allowance", U.S. Appl. No. 16/833,560, filed Jul. 19, 2022, 7 pages.
"Notice of Allowance", U.S. Appl. No. 16/963,623, filed Jul. 25, 2022, 8 pages.
"Foreign Office Action", EP Application No. 19756050.1, Jan. 24, 2022, 4 pages.
"Foreign Office Action", CN Application No. 201980069427.8, Oct. 18, 2021, 12 pages.
"International Preliminary Report on Patentability", Application No. PCT/US2019/043355, Jan. 25, 2022, 7 pages.
"International Preliminary Report on Patentability", Application No. PCT/US2019/063081, May 25, 2021, 9 pages.
"International Preliminary Report on Patentability", Application No. PCT/US2020/014638, Jul. 27, 2021, 7 pages.
"International Preliminary Report on Patentability", Application No. PCT/US2019/068265, Jan. 18, 2021, 31 pages.
"Non-Final Office Action", U.S. Appl. No. 16/963,623, filed Jan. 5, 2022, 12 pages.
"Non-Final Office Action", U.S. Appl. No. 16/210,969, filed Jun. 24, 2021, 19 pages.
"Notice of Allowance", U.S. Appl. No. 16/969,105, Feb. 7, 2022, 7 pages.
"Notice of Allowance", U.S. Appl. No. 16/210,969, filed Oct. 26, 2021, 5 pages.
"Notice of Allowance", U.S. Appl. No. 16/969,539, filed Dec. 30, 2021, 8 pages.
"3GPP TS 24.501 V16.3.0", 3GPP TS 24.501 version 16.3.0, Dec. 2019, 645 pages.
"3GPP TSG RAN WG4 25.942 V2.0.0: "RF System Scenarios"", TSG RAN Working Group 4 (Radio) Meeting #8, Oct. 1999, 65 pages.
"3rd Generation Partnership Project; Technical Specification Group Services and System Aspects; Security architecture and procedures for 5G system", 3GPP TS 33.501 version 16.1.0 Release 16, Dec. 2019, 202 pages.
"5G; Non-Access-Stratum (NAS) protocol for 5G System (5GS); Stage 3", 3GPP TS 24.501 version 15.1.0 Release 15, Oct. 2018, 406 pages.
"5G; Study on New Radio (NR) Access Technology", ETSI TR 138 912; V14.0.0; Technical Report; 3GPP TR 38.912 version 14.0.0 Release 14, May 2017, 77 pages.
"Beam Management and Beam Reporting", 3GPP TSG RAN WG1 Meeting #88bis, R1-1704488, Spokane, Washington, USA Apr. 3-7, 2017, 7 pages.
"Corrected Notice of Allowance", U.S. Appl. No. 16/419,854, filed Dec. 16, 2020, 2 pages.

"Discussion on HARQ Management and HARQ-ACK Feedback", 3GPP TSG RAN WG1 Meeting #91, R1-1720203, Reno, USA, Nov. 27-Dec. 1, 2017, 5 pages.
"Discussion on NR Beamforming with UE-Group-Specific Beam Sweeping", 3GPP TSG-RAN WG1 Meeting #86 R1-166219 Gothenburg, Sweden, Aug. 22-26, 2016, 7 pages.
"Final Office Action", U.S. Appl. No. 16/210,969, filed Jan. 7, 2021, 17 pages.
"International Preliminary Report on Patentability", Application No. PCT/US2019/069129, Apr. 7, 2021, 14 pages.
"International Preliminary Report on Patentability", Application No. PCT/US2019/068265, Jan. 18, 2021, 33 pages.
"International Preliminary Report on Patentability", Application No. PCT/US2019/051980, Dec. 8, 2020, 7 pages.
"International Preliminary Report on Patentability", Application No. PCT/US2019/063240, Feb. 18, 2021, 8 pages.
"International Search Report and Written Opinion", Application No. PCT/US2019/051980, Jul. 27, 2020, 19 pages.
"International Search Report and Written Opinion", Application No. PCT/US2019/043355, Mar. 31, 2020, 12 pages.
"International Search Report and Written Opinion", Application No. PCT/US2020/014638, May 13, 2020, 12 pages.
"International Search Report and Written Opinion", Application No. PCT/US2020/045777, Oct. 9, 2020, 13 pages.
"International Search Report and Written Opinion", Application No. PCT/US2019/069129, Mar. 31, 2020, 13 pages.
"International Search Report and Written Opinion", Application No. PCT/US2019/046374, Apr. 14, 2020, 13 pages.
"International Search Report and Written Opinion", Application No. PCT/US2020/022460, May 26, 2020, 13 pages.
"International Search Report and Written Opinion", Application No. PCT/US2020/031716, Jul. 20, 2020, 14 pages.
"International Search Report and Written Opinion", Application No. PCT/US2019/063081, Feb. 21, 2020, 14 pages.
"International Search Report and Written Opinion", Application No. PCT/US2019/063620, Mar. 9, 2020, 14 pages.
"International Search Report and Written Opinion", Application No. PCT/US2019/052005, May 18, 2020, 14 pages.
"International Search Report and Written Opinion", Application No. PCT/US2020/017930, May 29, 2020, 14 pages.
"International Search Report and Written Opinion", Application No. PCT/US2019/063240, Feb. 13, 2020, 16 pages.
"International Search Report and Written Opinion", Application No. PCT/US2019/068265, Apr. 29, 2020, 29 pages.
"Invitation to Pay Additional Fees", Application No. PCT/US2019/051980, Jun. 4, 2020, 10 pages.
"Invitation to Pay Additional Fees", Application No. PCT/US2019/068265, Mar. 13, 2020, 13 pages.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0, Oct. 2018, 366 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"Non-Final Office Action", U.S. Appl. No. 16/210,969, filed Jul. 23, 2020, 15 pages.
"Non-Final Office Action", U.S. Appl. No. 16/206,579, 23 pages.
"Non-Final Office Action", U.S. Appl. No. 16/419,854, filed Jun. 30, 2020, 29 pages.
"Notice of Allowance", U.S. Appl. No. 16/206,579, filed Jul. 8, 2020, 10 pages.
"Notice of Allowance", U.S. Appl. No. 16/419,854, filed Nov. 5, 2020, 11 pages.
"On the Need for More Flexible Configurations Related to CSI Reporting", 3GPP TSG RAN WG1 Meeting #87, R1-1611237, Reno, USA, Nov. 14 -18, 2016, 6 pages.
"Supplemental Notice of Allowance", U.S. Appl. No. 16/206,579, filed Sep. 30, 2020, 3 pages.

(56) References Cited

OTHER PUBLICATIONS

"Third Generation Partnership Project; Technical Specification Group Services and System Aspects; Service requirements for the 5G system; Stage 1", 3GPP TS 22.261 version 16.10.0 Release 16, Dec. 2019, 72 pages.
"U.S. Appl. No. 62/785,949", Filed on Dec. 28, 2018, 39 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Universal Mobile Telecommunications System (UMTS); Automatic Neighbour Relation (ANR) for UTRAN", 3GPP TS 25.484 version 10.0.1 Release 10, Jan. 2012, 21 pages.
"Universal Mobile Telecommunications System (UMTS); Automatic Neighbour Relation (ANR) for UTRAN", 3GPP TS 25.484 version 11.0.0 Release 11, Jan. 2012, 22 pages.
"Written Opinion", Application No. PCT/US2019/063240, Oct. 27, 2020, 10 pages.
"Written Opinion", Application No. PCT/US2019/068265, Sep. 25, 2020, 20 pages.
"Written Opinion", Application No. PCT/US2020/014638, Nov. 26, 2020, 5 pages.
"Written Opinion", PCT Application No. PCT/US2020/031716, Mar. 25, 2021, 6 pages.
"Written Opinion", PCT Application No. PCT/US2019/069129, Dec. 14, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Fodor, Gabor et al., "Design Aspects of Network Assisted Device-to-Device Communications", IEEE Communications Magazine, May 2011, 9 pages.
Gorcin, Ali et al., "Hybrid Automatic Neighbor Relations for 5G Wireless Networks", 2017, 6 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J., "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Tavanpour, Misagh, "Upload User Collaboration in the Data Upload for LTE-Advanced Networks", Carleton University, Ottawa, Ontario, 2016, 199 pages.
Wu, Chih-Hsiang, "Handling Overheating in a Wireless-Communication Device", Technical Disclosure Commons; Retrieved from https://www.tdcommons.org/dpubs_series/2343, Jul. 12, 2019, 22 pages.
Zhang, Jinfang et al., "PoC of SCMA-Based Uplink Grant-Free Transmission in UCNC for 5G", IEEE Journal on Selected Areas in Communications, vol. 35, No. 6, Jun. 2017, 10 pages.
Zhang, Jinyu et al., "Grant-less Uplink Transmission for LTE Operated in Unlicensed Spectrum", Feb. 14, 2018, 6 pages.
"Foreign Office Action", IN Application No. 202147041653, Apr. 26, 2022, 6 pages.
"Foreign Office Action", IN Application No. 202147026024, Jun. 3, 2022, 7 pages.
"Non-Final Office Action", Application No. 16/969,105, Apr. 29, 2022, 8 pages.
"Evolved Universal Terrestrial Radio Access (E-UTRA)—Medium Access Control (MAC) Protocol Specification", 3GPP TS 36.321 Version 12.5. Release 12, Apr. 2015, 79 pages.
"Foreign Office Action", KR Application No. 10-2020-7022366, Feb. 23, 2022, 11 pages.
"Foreign Office Action", IN Application No. 202147031380, Mar. 8, 2022, 8 pages.

"Foreign Office Action", IN Application No. 202147025618, Mar. 11, 2022, 5 pages.
"Foreign Office Action", IN Application No. 202147051065, Mar. 28, 2022, 8 pages.
"International Preliminary Report on Patentability", Application No. PCT/US2019/046374, Feb. 8, 2022, 8 pages.
"International Preliminary Report on Patentability", Application No. PCT/US2019/052005, Mar. 31, 2022, 8 pages.
"Non-Final Office Action", U.S. Appl. No. 16/833,560, filed Feb. 16, 2022, 15 pages.
"Notice of Allowance", U.S. Appl. No. 16/969,539, filed Mar. 30, 2022, 5 pages.
"Foreign Office Action", IN Application No. 202247001696, Oct. 21, 2022, 6 pages.
"Foreign Office Action", EP Application No. 19845895.2, Dec. 13, 2022, 7 pages.
"Notice of Allowance", U.S. Appl. No. 16/963,623, filed Oct. 31, 2022, 6 pages.
"Foreign Office Action", EP Application No. 19842524.1, May 11, 2023, 22 pages.
"Notice of Allowance", U.S. Appl. No. 17/287,898, filed Jun. 26, 2023, 12 pages.
"International Preliminary Report on Patentability", Application No. PCT/US2019/068265, Jan. 18, 2021, 20 pages.
"International Preliminary Report on Patentability", Application No. PCT/US2019/063620, May 25, 2021, 8 pages.
"International Preliminary Report on Patentability", Application No. PCT/US2020/045777, Jun. 21, 2021, 8 pages.
"International Preliminary Report on Patentability", Application No. PCT/US2020/031716, Jul. 30, 2021, 7 pages.
"Written Opinion", Application No. PCT/US2019/069129, Dec. 14, 2020, 7 pages.
"Written Opinion", Application No. PCT/US2020/031716, Mar. 25, 2021, 6 pages.
"Written Opinion", PCT Application No. PCT/US2020/031716, Aug. 20, 2021, 6 pages.
"Final Office Action", EP Application No. 19783187.8, Jan. 27, 2023, 4 pages.
"Foreign Office Action", EP Application No. 19827946.5, Feb. 24, 2023, 7 pages.
"Notice of Allowance", U.S. Appl. No. 16/969,105, Feb. 1, 2023, 7 pages.
"Notice of Allowance", U.S. Appl. No. 16/963,623, filed Feb. 22, 2023, 5 pages.
"Foreign Office Action", TW Application No. 20209124827, 13 pages.
"International Preliminary Report on Patentability", Application No. PCT/US2020/017930, Aug. 10, 2021, 9 pages.
"International Preliminary Report on Patentability", Application No. PCT/US2020/022460, Aug. 25, 2021, 8 pages.
"International Preliminary Report on Patentability", Application No. PCT/US2020/031716, Oct. 15, 2021, 7 pages.
"Non-Final Office Action", U.S. Appl. No. 16/969,539, filed Sep. 16, 2021, 13 pages.
"Foreign Office Action", CN Application No. 201980082695.3, Aug. 31, 2023, 25 pages.
"Foreign Office Action", CN Application No. 201980083468.2, Sep. 21, 2023, 11 pages.
"Foreign Office Action", TW Application No. 111132535, Oct. 20, 2023, 8 pages.
"Non-Final Office Action", U.S. Appl. No. 17/603,328, filed Sep. 27, 2023, 8 pages.
"Non-Final Office Action", U.S. Appl. No. 17/423,836, filed Oct. 5, 2023, 9 pages.
"Non-Final Office Action", U.S. Appl. No. 17/295,815, filed Oct. 10, 2023, 10 pages.
"Notice of Allowance", U.S. Appl. No. 17/433,197, filed Oct. 19, 2023, 10 pages.
Trendafilov, et al., "Model of Coordination Flow in Remote Collaborative Interactions", Mar. 2015, 8 pages.
"Final Office Action", U.S. Appl. No. 17/423,836, filed Mar. 14, 2024, 10 pages.

(56) References Cited

OTHER PUBLICATIONS

"Foreign Office Action", EP Application No. 20728338.3, Apr. 19, 2024, 8 pages.
"Foreign Office Action", VN Application No. 1202004517, Apr. 24, 2024, 3 pages.
"Non-Final Office Action", U.S. Appl. No. 17/295,815, filed Apr. 1, 2024, 13 pages.
"Non-Final Office Action", U.S. Appl. No. 17/765,279, filed Apr. 11, 2024, 16 pages.
"Coordinated Multi-Point Transmission—Exploring Possible System Operations and UE Support", TSG-RAN WG1 #55—R1-084407, Nov. 10, 2008, 5 pages.
"Final Office Action", U.S. Appl. No. 17/295,815, filed Jan. 3, 2024, 12 pages.
"Foreign Office Action", CN Application No. 201980082695.3, Jan. 20, 2024, 8 pages.
"Foreign Office Action", CN Application No. 201980012509.9, Feb. 8, 2024, 28 pages.
"Foreign Office Action", CN Application No. 202080010100.6, Dec. 1, 2023, 10 pages.
"Notice of Allowance", U.S. Appl. No. 17/603,328, filed Dec. 27, 2023, 11 pages.
"Notice of Allowance", U.S. Appl. No. 17/423,836, Jun. 13, 2024, 7 pages.
"Notice of Allowance", U.S. Appl. No. 17/295,815, Jun. 28, 2024, 9 pages.
"Foreign Office Action", CN Application No. 202080071966.8, Aug. 28, 2024, 26 pages.

* cited by examiner

ABSTRACT AND TITLE PAGE

USER-EQUIPMENT-COORDINATION SET FOR A WIRELESS NETWORK

RELATED APPLICATION(S)

This application is a national stage entry of International Application No. PCT/US2019/068265, filed Dec. 23, 2019, which claims the benefit of U.S. Provisional Application No. 62/785,949, filed Dec. 28, 2018, the disclosures which are incorporated herein by reference in their entirety.

BACKGROUND

Generally, a provider of a wireless network manages wireless communications over the wireless network. For example, a base station manages a wireless connection with a user equipment (UE) that is connected to the wireless network. The base station determines configurations for the wireless connection, such as bandwidth, timing, and protocol for the wireless connection.

The quality of service between the UE and the base station can be degraded by a number of factors, such as loss in signal strength, bandwidth limitations, interfering signals, and so forth. This is particularly true for UEs operating at a cell edge, which is frequently troubled by weak signal quality. A number of solutions have been developed to address cell-edge issues occurring in certain wireless communication systems. However, with recent advancements in wireless communication systems, such as increased data transmission speeds associated with Fifth Generation New Radio (5G NR), at least some of those previous solutions have become less efficient.

SUMMARY

This document describes techniques and apparatuses for a user-equipment-coordination set (UE-coordination set) for a wireless network. In implementations, a base station specifies a set of user equipments to form the UE-coordination set for joint transmission and/or joint reception of communications intended for a target user equipment, where the UE-coordination set is specified to include the target user equipment and at least one other user equipment. The base station then selects a user equipment within the UE-coordination set to act as a coordinating user equipment for the UE-coordination set and transmits a request message that directs the coordinating user equipment to coordinate the joint transmission and/or joint reception of the communications intended for the target user equipment. In implementations, the base station transmits, to the UE-coordination set, a downlink signal, that is intended for the target user equipment for joint reception.

Aspects of UE-coordination set for a wireless network include a user equipment receiving, over the wireless network, a request message from a base station that directs the user equipment to join a UE-coordination set for processing communications intended for a target user equipment. In some implementations, the user equipment is the target user equipment, while in other implementations, the user equipment is different from the target user equipment. The user equipment generates a first set of baseband samples from a downlink signal that includes information intended for the target user equipment. The user equipment also receives, from at least one user equipment within the UE-coordination set and over a local wireless network, a second set of baseband samples of the downlink signal. The user equipment then aggregates at least the first set of baseband samples and the second set of baseband samples to generate a combined set of baseband samples, and jointly processes the combined set of baseband samples to decode the information intended for the target user equipment.

By having multiple UEs form a UE-coordination set for joint transmission and reception of data intended for a target UE within the UE-coordination set, the UEs in the UE-coordination set coordinate in a manner similar to a distributed antenna for the target UE to strengthen and improve the effective signal quality between the target UE and the base station. Downlink data intended for the target UE can be transmitted to the multiple UEs in the UE-coordination set. Each of the UEs demodulates and samples the downlink data and then forwards the samples to a single UE in the UE-coordination set, such as a coordinating UE or the target UE, for joint processing. In addition, uplink data generated by the target UE can be distributed to the multiple UEs in the UE-coordination set for joint transmission to the base station. Coordinating joint transmission and reception of data intended for the target UE significantly increases the target UE's effective transmission power and improves the effective signal quality.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of a UE-coordination set for a wireless network are described below. The use of the same reference numbers in different instances in the description and the figures indicate similar elements.

DETAILED DESCRIPTION

Overview

Figure 1:
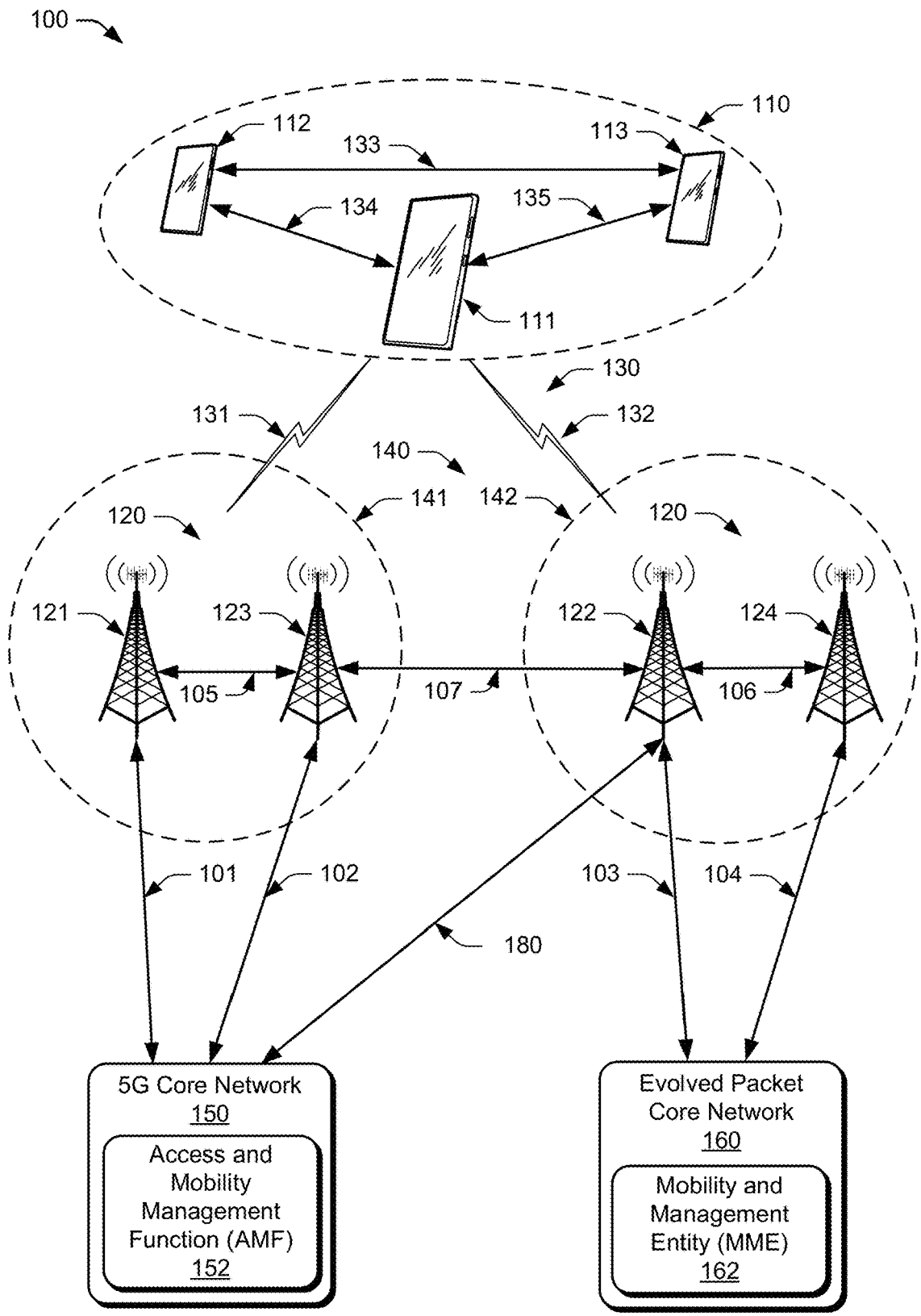
FIG. 1 illustrates an example operating environment in which aspects of a UE-coordination set for a wireless network can be implemented.

In conventional wireless communication systems, a signal quality between a user equipment (UE) and a base station can be degraded by a number of factors, such as signal interference or distance between the UE and the base station, resulting in slower and less efficient data transmission. This degradation of the signal quality is common for a UE located near the cell edge of the base station.

Aspects of UE-coordination set for a wireless network include a user equipment receiving, over the wireless network, a request message from a base station that directs the user equipment to join a UE-coordination set for processing communications intended for a target user equipment. In some implementations, the user equipment is the target user equipment, while in other implementations, the user equipment is different from the target user equipment. The user equipment generates a first set of baseband samples from a downlink signal that includes information intended for the target user equipment. The user equipment also receives, from at least one user equipment within the UE-coordination set and over a local wireless network, a second set of baseband samples of the downlink signal. The user equipment then aggregates at least the first set of baseband samples and the second set of baseband samples to generate a combined set of baseband samples, and jointly processes the combined set of baseband samples to decode the information intended for the target user equipment.

By having multiple UEs form a UE-coordination set for joint transmission and reception of data intended for a target UE within the UE-coordination set, the UEs in the UE-coordination set coordinate in a manner similar to a distributed antenna for the target UE to strengthen and improve the effective signal quality between the target UE and the base station. Downlink data intended for the target UE can be transmitted to the multiple UEs in the UE-coordination set. Each of the UEs demodulates and samples the downlink data and then forwards the samples to a single UE in the UE-coordination set, such as a coordinating UE or the target UE, for joint processing. In addition, uplink data generated by the target UE can be distributed to the multiple UEs in the UE-coordination set for joint transmission to the base station. Coordinating joint transmission and reception of data intended for the target UE significantly increases the target UE's effective transmission power and improves the effective signal quality.

Multiple UEs can each receive downlink data transmissions from the base station 120. These UEs may not decode the downlink transmissions into data packets and then forward the data packets to a destination, as in conventional relay techniques. Rather, the UEs determine where to forward raw in-phase/quadrature (I/Q) samples of the downlink transmissions, such as to a coordinating UE or a target UE. In aspects, the target UE may include a subset of target UEs within the UE-coordination set. The coordinating UE (or the target UE) receives the raw I/Q samples from the other UEs in the UE-coordination set and stores the I/Q samples in a buffer memory. Then, the coordinating UE (or the target UE) synchronizes and decodes the stored raw I/Q samples into data packets for the target UE(s). Accordingly, the processing of the raw I/Q samples occurs at the coordinating UE or the target UE. In this way, the UE-coordination set acts as a distributed antenna for the target UE. The target UE includes its own antenna(s) and participates in the collecting of data in the I/Q format from the base station and forwarding the raw I/Q data to the coordinating UE. If the target UE is the coordinating UE, however, then the target UE does not forward the raw I/Q samples to itself.

In one use case, multiple UEs carried by a group of hikers in a low radio coverage area can form a UE-coordination set to transmit a message to a base station at a higher effective transmit power than would be possible for an individual UE in that area. Additionally, those UEs can form a UE-coordination set to receive a message from the base station for one of the UEs at a higher effective receive power than would be possible for that one UE to individually receive. One of the multiple UEs acts as a coordinating UE for the UE-coordination group to aggregate data signals intended for a target UE and received by the UE-coordination group. Each of the UEs demodulates and samples the radio frequency signals and forwards the baseband samples to the coordinating UE using a local wireless network or a personal area network, such as Bluetooth™. Then, the coordinating UE aggregates and process the samples to generate decoded data and provide the decoded data to the target UE. Alternatively, the coordinating UE can forward the stored samples to the target UE to allow the target UE to demodulate the data.

In another use case, a single user may have a work smartphone and a personal smartphone. In some cases, both the work smartphone and the personal smartphone may be located in a basement home-office with low cellular coverage. The work smartphone and the personal smartphone can form a UE-coordination set to transmit messages to, or receive messages from, a base station at a higher effective transmit or receive power than either smartphone is capable of individually. The work smartphone and the personal smartphone may also form a UE-coordination set with one or more other devices (e.g., tablet, smart appliance, Internet-of-things device) in the home to further increase the effective transmit and/or receive power of the work smartphone or the personal smartphone.

In aspects, a method for creating a UE-coordination set by a base station is described. The method includes a base station specifying a set of UEs to form the UE-coordination set for joint transmission and reception of data intended for a target UE. The UE-coordination set is specified to include the target UE and at least one other UE. The method includes selecting one of the UEs within the UE-coordination set to act as a coordinating UE for the UE-coordination set. The method also includes transmitting a request message that directs the one of the UEs to coordinate the joint transmission and reception of the data intended for the target UE. Additionally, the method includes transmitting a downlink signal, intended for the target UE, to each UE in the UE-coordination set effective to: enable each UE within the UE-coordination set to demodulate and sample the downlink signal and then forward the samples to the coordinating UE; and enable the coordinating UE to combine the samples from each UE and jointly process the combined samples to provide decoded data.

In aspects, a method performed by a UE in a wireless communications network is described. The method includes the UE receiving a request message from a base station directing the UE to join a UE-coordination set. Additionally, the method includes the UE receiving baseband signals from at least one UE within the UE-coordination set. The baseband signals may correspond to information intended for the target UE and received by UEs in the UE-coordination set. The method also includes the UE aggregating the baseband signals to provide a combined baseband signal. In addition, the method includes jointly processing the combined baseband signal to decode the information intended for the target UE. The method also includes providing, based on the decoded information, downlink data corresponding to the aggregated information to the target UE.

In aspects, a UE is disclosed that includes a radio frequency (RF) transceiver coupled to a processor and memory system. The processor and memory system includes instructions that are executable to receive an indication from a base station specifying a UE-coordination set for joint transmission and reception of user data for a target UE. The indication may include an identifier of one or more additional UEs assigned to the UE-coordination set. The instructions are further executable to receive a configuration message requesting the UE to act as a coordinating UE for the UE-coordination set. Additionally, the instructions are executable to, based on the configuration message, coordinate the joint transmission and reception of the user data for the target UE by using the one or more additional UEs in the UE-coordination set for the joint transmission and reception of user data for the target UE.

In aspects, a base station is disclosed that includes a radio-frequency transceiver coupled to a processor and memory system. The processor and memory system includes instructions that are executable to: identify one or more UEs to include in a UE-coordination set for a target UE; and command the target UE and the one or more UEs to form the UE-coordination set for the target UE. Additionally, the instructions are executable to transmit a configuration message to one of the UEs within the UE-coordination set to request that UE to act as a coordinating UE and aggregate information received by UEs in the UE-coordination set and intended for the target UE. The instructions are also executable to transmit downlink radio frequency signals corresponding to the information intended for the target UE to the UEs in the UE-coordination set effective to enable joint reception and processing of the information at the coordinating UE.

Example Environments

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121, 122, 123, and 124) through one or more wireless communication links 130 (wireless link 130), illustrated as wireless links 131 and 132. Each UE 110 in a UE-coordination set can communicate with a coordinating UE of the UE-coordination set and/or a target UE in the UE-coordination set through one or more local wireless network connections (e.g., personal area network, near-field communication (NFC), Bluetooth™, ZigBee™) such as local wireless network connections 133, 134, and 135. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as a NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 101 and 102 respectively, to the 5GC 150 using an NG2 interface for control-plane signaling and using an NG3 interface for user-plane data communications. The base stations 122 and 124 connect, at 103 and 104 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using the NG2 interface for control-plane signaling and using the NG3 interface for user-plane data communications, at 180.

In addition to connections to core networks, base stations 120 may communicate with each other. The base stations 121 and 123 communicate using an Xn interface at 105. The base stations 122 and 124 communicate using an X2 interface at 106. At least one base station 120 (base station 121 and/or base station 123) in the NR RAN 141 can communicate with at least one base station 120 (base station 122 and/or base station 124) in the E-UTRAN 142 using an Xn interface 107. In aspects, base stations 120 in different RANs (e.g., master base stations 120 of each RAN) communicate with one another using an Xn interface such as Xn interface 107.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110 using the base stations 120.

Example Devices

Figure 2:
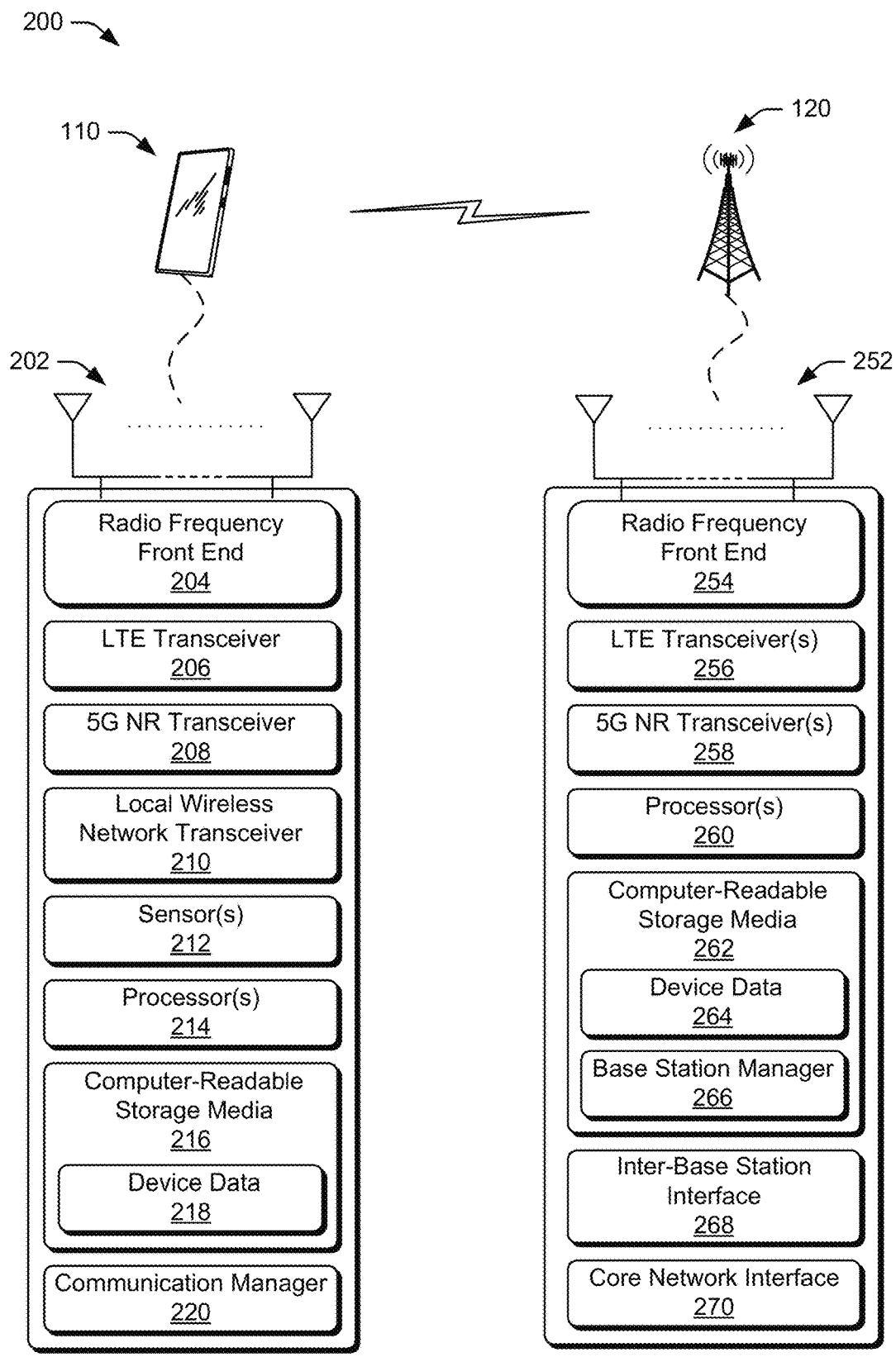
FIG. 2 illustrates an example device diagram of a user equipment and a serving cell base station that can be used to implement aspects of a UE-coordination set for a wireless network.

FIG. 2 illustrates an example device diagram 200 of a user equipment and a service cell base station. In aspects, the device diagram 200 describes devices that can implement various aspects of a UE-coordination set for a wireless network. Included in FIG. 2 are the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more local wireless networks (e.g., WLAN, Bluetooth, NFC, a personal area network (PAN), WiFi-Direct, IEEE 802.15.4, ZigBee, Thread, mmWave) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220. Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for a UE-coordination set for a wireless network.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

UE-Coordination Set

Figure 3:
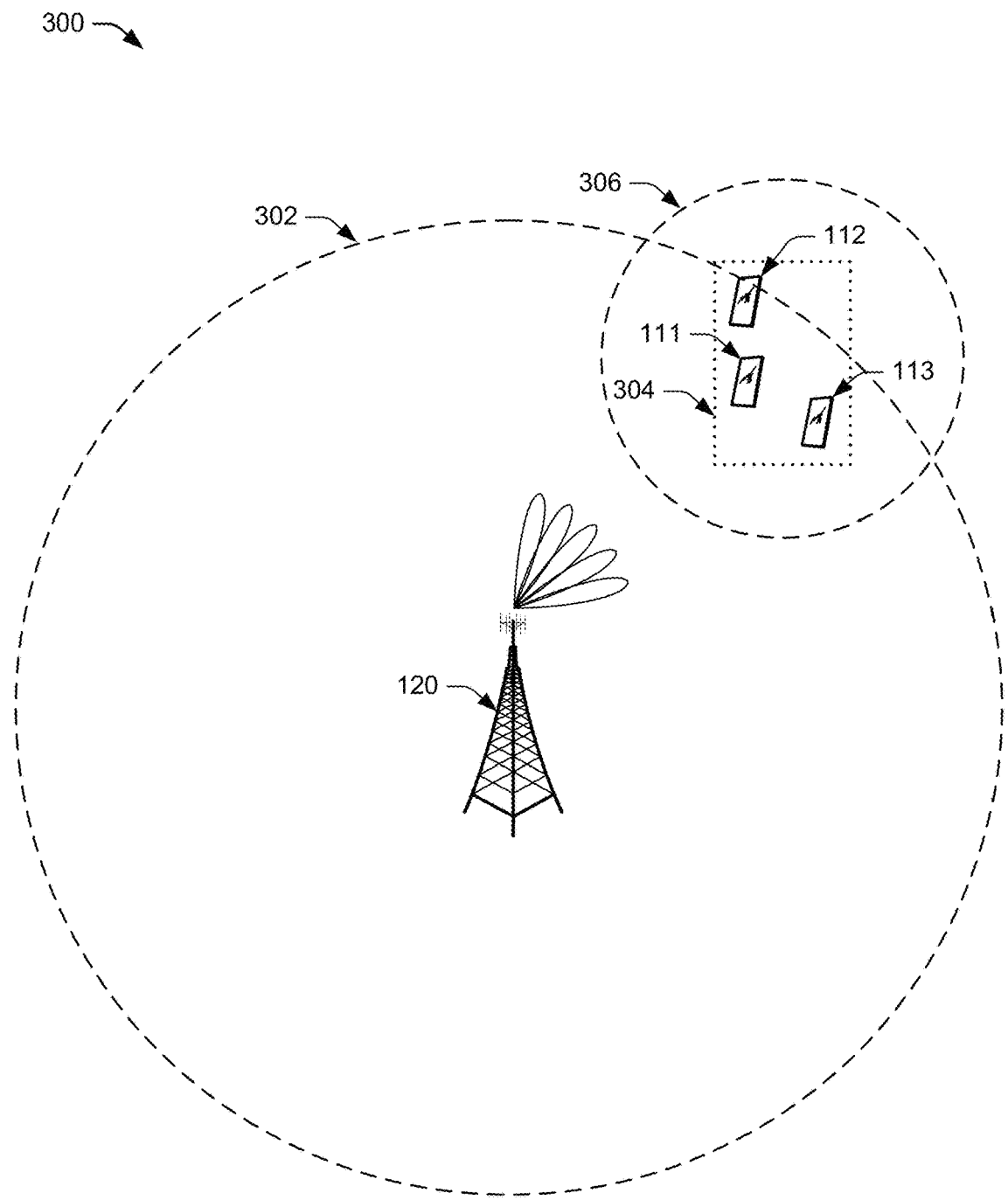
FIG. 3 illustrates an example implementation of a UE-coordination set for a wireless network.

FIG. 3 illustrates an example implementation 300 of a UE-coordination set for a wireless network. The illustrated example includes a service cell base station (base station 120), UE 111, UE 112, and UE 113. In an example, each of the UEs illustrated in FIG. 3 may have limited transmission power, which may cause difficulties in transmitting data to the base station 120. This may be due, at least partially, to the UEs being proximate to a cell edge 302 of the base station 120 or the UEs being in a transmission-challenged location (e.g., a basement, urban canyon, etc.) that has a poor link budget. Each of the UEs illustrated in FIG. 3 may also, or alternatively, have limited reception power, which may be affected by cell-edge transmission power of the base station 120, as well as multipath, signal interference from other transmitters or overhead electrical wires, attenuation from weather or objects such as buildings, trees, etc.

Using the techniques described herein, the base station 120 can specify a set of UEs (e.g., the UE 111, UE 112, and UE 113) to form a UE-coordination set (e.g., the UE-coordination set 304) for joint transmission and/or joint reception of data for a target UE (e.g., the UE 112). The base station 120 may determine, based on information corresponding to the UEs (e.g., UE location, signal level, battery level, and so on), whether coordination is beneficial for a particular UE or not. Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 120 may determine a UE-coordination set based on various factors, such as a location of each UE relative to the base station 120, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam or beams that are close to each other (e.g., adjacent or overlapping beams). Timing advance may indicate a distance between a UE and the base station. A similar timing advance for each UE in a group indicates that those UEs are approximately the same distance from the base station. UEs within a predefined distance of one another that are all a similar distance from the base station may be capable of working together in a UE-coordination set in a distributed fashion to improve a signal strength and quality of a single UE in the UE-coordination set. Thus, UEs in the UE-coordination set may have the same timing advance, or timing advances that are within a predetermined threshold of each other.

The base station can send layer-2 messages (e.g., Media Access Control layer) and/or layer-3 (e.g., Service Data Adaptation Protocol layer) messages to UEs to direct or request those UEs to join the UE-coordination set. The base station can provide additional data to the UEs within the UE-coordination set to enable the UEs to communicate with at least the coordinating UE or the target UE. The additional data may include an identity of the coordinating UE and/or an identity of the target UE, security information, and/or local wireless network information.

The base station can receive a response message from a UE in the UE-coordination set acknowledging the request message. In some cases, the base station can receive a response message from at least two of the UEs acknowledging that a UE has joined the UE-coordination set. The response message may indicate that the request message has been approved by a user of the UE.

In addition, the base station can identify and command (or request) a specific UE within the UE-coordination set to act as a coordinating UE (e.g., master UE) for the UE-coordination set. For example, the base station 120 can transmit a configuration message (e.g., request message) to the specific UE to request that the specific UE act as the coordinating UE for the UE-coordination set. The specific UE may accept or decline the request based on user input from a user of the UE or a setting that is set to automatically accept or decline such requests. In some aspects, the UE may transmit a UE-capability message or other layer-3 message as a response to the request message from the base station 120. The coordinating UE can coordinate the messages and samples sent between UEs within the UE-coordination set for joint transmission and/or joint reception. In aspects, the coordinating UE can determine where the joint processing is to occur, e.g., at the coordinating UE or the target UE. In an example, the coordinating UE can coordinate how a particular UE in the UE-coordination set is to send I/Q samples, which the particular UE receives from the base station, to the target UE.

The base station can select the coordinating UE from the group of UEs in the UE-coordination set based on a variety of factors, some of which may be signaled to the base station by the UE using a UE-capability message. One example factor includes processing power of the coordinating UE, which provides the coordinating UE the capability to handle certain aspects of the UE-coordination set including central coordination or scheduling. Another factor may include a battery-level state of the coordinating UE. For instance, if a particular UE in the UE-coordination set has a low battery, then that UE may not be a good candidate to act as the coordinating UE. Accordingly, UEs within the UE-coordination set that have a battery-level state above a threshold value may be considered as candidates for selection as the coordinating UE. In one example, the base station may first select one UE as a coordinating UE, and receive, subsequent to formation of the UE-coordination set, messages from the other UEs in the UE-coordination set indicating respective battery-level states. Then, the base station can change the coordination UE if another UE in the UE-coordination set would be a better candidate based on the battery-level states of the UEs in the UE-coordination set.

Yet another factor may include a location of the coordinating UE. The base station may identify the location of the UEs in the UE-coordination set based on various factors, such as angle of arrival of signals from the UE, timing advance, observed time difference of arrival (OTDOA), and so on. An ideal location for the coordinating UE may be geographically central in the UE-coordination set, as this may maximize the coordinating UE's capability to coordinate and communicate with the other UEs in the UE-coordination set. However, the coordinating UE is not required to be in a central location of the UEs in the UE-coordination set. Rather, the coordinating UE can be located at any location within the UE-coordination set that allows the coordinating UE to communicate and coordinate with the other UEs in the UE-coordination set. The base station constantly monitors the UE-coordination set and can update the coordinating UE at any time based on updated factors, such as updated UE locations, UE battery-level state, and so on. Or, as mentioned previously, the coordinating UE may transfer its joint processing responsibilities to another UE based on factors such as processing power, battery level, and/or geographic location.

In some aspects, the base station can receive indications from one or more UEs in the UE-coordination set that advertise their capability to act as the coordinating UE. Additionally or alternatively, the base station can receive indications from one or more UEs in the UE-coordination set that indicate a willingness of a user of a respective UE to allow their UE to participate in the UE-coordination set and/or act as the coordinating UE. Accordingly, a UE in the UE-coordination set can indicate, using a layer-3 message, to the base station whether it is capable of acting and/or permitted to act as the coordinating UE.

In the illustrated example 300 in FIG. 3, the base station 120 may select UE 111 to act as the coordinating UE since the UE 111 is located between UE 112 and UE 113 or because the UE 111 is capable of communicating with each of the other UEs 112 and 113 in the UE-coordination set. The base station 120 may select the coordinating UE for various reasons, examples of which are described above. Being at the cell edge, all three of the UEs 111, 112, 113 have a weak cellular reception (and transmission) power. The base station 120 selects UE 111 to coordinate messages and samples sent between the base station 120 and the UEs 111, 112, 113 for the target UE 112. Such communication between the UEs can occur using a local wireless network 306, such as a PAN, NFC, Bluetooth, WiFi-Direct, local mmWave link, etc. In this example, all three of the UEs 111, 112, 113 receive RF signals from the base station 120. The UE 112 and the UE 113 demodulate the RF signals to baseband I/Q analog signals, sample the baseband I/Q analog signals to produce I/Q samples, and forward the I/Q samples along with system timing information (e.g., system frame number (SFN)) the local to the coordinating UE 111 using the local wireless network transceiver 210. The coordinating UE 111 then uses the timing information to synchronize and combine the I/Q samples and processes the combined signal to decode data packets for the target UE 112. The coordinating UE 111 then transmits the data packets to the target UE 112 using the local wireless network 306.

When the target UE 112 has uplink data to send to the base station 120, the target UE transmits the uplink data to the coordinating UE 111, which uses the local wireless network 306 to distribute the uplink data to each UE in the UE-coordination set 304. Each UE in the UE-coordination set 304 synchronizes with the base station 120 for timing information and its data transmission resource assignment. Then, all three UEs in the UE-coordination set 304 jointly transmit the uplink data to the base station 120. The base station 120 receives the jointly-transmitted uplink data from the UEs 111, 112, 113 and processes the combined signal to decode the uplink data from the target UE 112.

Joint Transmission and Reception

The UE-coordination set 304 enhances the target UE's ability to transmit data to the base station 120 and receive data from the base station 120 by generally acting as a distributed antenna of the target UE 112. For example, the base station 120 transmits downlink data using RF signals to multiple UEs in the UE-coordination set 304. At least some of the multiple UEs demodulate the received RF signals to an analog baseband signal and sample the baseband signal to produce a set of I/Q samples, which the UEs send to the coordinating UE along with system timing information. The coordinating UE accumulates and stores the I/Q samples from each UE in a memory buffer. Because each of the UEs in the UE-coordination set 304 synchronizes with the base station 120, all of the UEs in the UE-coordination set 304 have a common time, based on a common time base (e.g., system frame number (SFN)), effective to enable the coordinating UE to manage the timing and aligning of the I/Q samples for the accumulation and storage of the I/Q samples in the memory buffer. For joint reception and decoding, the coordinating UE processes the stored I/Q samples to decode the downlink data for the target UE. In aspects, I/Q samples can be processed at multiple UEs (e.g., less than all the UEs in the UE-coordination set), at the target UE 112, or at the coordinating UE 111. At least a subset of the UEs in the UE-coordination set 304 can participate in the accumulation and/or the joint processing of the downlink I/Q samples. In at least one aspect, the coordinating UE 111 can select which UEs in the UE-coordination set 304 are to be included in the subset of UEs that participate in the accumulation and/or the joint processing of the downlink I/Q samples. In other aspects, the base station 120 can make this selection.

Multiple UEs can each receive downlink transmissions from the base station 120. These UEs may not decode the downlink transmissions into data packets and then forward the data packets to a destination, as in conventional relay techniques. Rather, the UEs determine where to forward raw I/Q samples of the downlink transmissions, such as to the coordinating UE 111 or the target UE 112. In aspects, the target UE 112 may include a subset of target UEs within the UE-coordination set 304. The coordinating UE 111 (or the target UE 112) receives the raw I/Q samples from the other UEs in the UE-coordination set 304 and stores the I/Q samples in a buffer memory. Then, the coordinating UE 111 (or the target UE 112) decodes the stored raw I/Q samples into data packets for the target UE(s) 112. Accordingly, the processing of the raw I/Q samples occurs at the coordinating UE 111 or the target UE 112. In this way, the UE-coordination set 304 acts as a distributed antenna for the target UE 112. The target UE 112 includes its own antenna(s) and participates in the collecting of data in the I/Q format from the base station 120 and forwarding the raw I/Q data to the coordinating UE 111.

In one example, a UE-coordination set includes three UEs, each having two antennas. The base station sends a downlink signal for one target UE in the UE-coordination set, where the target UE is acting as the coordinating UE of the UE-coordination set. Typically, the target UE would only have use of its own antennas (in this example, the target UE only has two antennas) to receive the downlink signal. Here, however, all three UEs (each using two antennas) in the UE-coordination set receive the downlink signal and forward the downlink signal to the target UE. In this way, the target UE behaves as if it had six antennas, which significantly enhances the signal strength of the target UE. Each UE in the UE-coordination set does not decode the downlink signal. Rather, each UE in the UE-coordination set may demodulate the downlink signal (e.g., RF signal) to an analog baseband signal and sample the baseband signal to produce I/Q samples. This is because one or more of the UEs may not be able to individually demodulate or decode the signal properly, particularly if they are near the cell edge and/or have a relatively weak signal strength due to interference or channel impairments affecting the link budget. The I/Q samples are forwarded to the coordinating UE, which aggregates and decodes the I/Q samples into downlink data for the target UE. Accordingly, the downlink signals from all the UEs in the UE-coordination set are jointly received to provide an effective signal strength sufficient to demodulate and decode the packet at a single UE.

In aspects, UEs within the same coordination set can jointly receive downlink transmissions from the base station for a subset of UEs in the UE-coordination set, rather than for a single target UE. Each UE in the UE-coordination set can produce raw I/Q samples from the downlink transmissions and forward the raw I/Q samples to the subset of UEs. The UEs within the same coordination set can perform joint or coherent processing for data sent by the base station. Coherent processing refers to the UEs functioning as a receive antenna chain such that the data is coherently combined at the subset of UEs or the coordinating UE. The subset of UEs or the coordinating UE can use the raw I/Q samples to perform the joint processing of the downlink transmissions.

For joint transmission, multiple UEs in the UE-coordination set 304 each use their respective antennas and transmitters to transmit uplink data from the target UE 112 on air interface resources as directed by the base station coordinating the UE-coordination set. In this way, the target UE's uplink data can be processed together and transmitted using the transmitters and the transmission antennas of multiple (including all) UEs in the UE-coordination set 304. In an example, the target UE 112 uses its local wireless network transceiver 210 to transmit uplink data to the coordinating UE 111. The coordinating UE 111 uses its local wireless network transceiver 210 to distribute the data to the other UEs in the UE-coordination set 304. Then, all the UEs in the UE-coordination set 304 process and transmit the uplink data to the base station 120. In this way, the distributed transmission provides for a better effective link budget given the channel impairments encountered by the target UE 112.

In an example, the coordinating UE 111 replicates the same uplink signal across the multiple UEs' transmit antennas, which combines the power from multiple UEs' power amplifiers. Replicating the signal across multiple UEs for joint transmission significantly increases the effective transmit power over any single UE's transmit power. The coordinating UE 111 and the target UE 112 also each transmit a replica of the uplink signal. So, similar to the downlink described above, the additional UEs in the UE-coordination set function as additional antennas for the target UE 112. In aspects, the UEs in the UE-coordination set 304 communicate with each other and with the coordinating UE 111 using the local wireless network 306, such as Wi-Fi.

UEs within the same UE-coordination set 304 can jointly send data packets for the target UE 112 to the base station 120. For example, a subset of UEs in the UE-coordination set 304 can perform joint transmission for the target UE 112 (or a subset of UEs) within the UE-coordination set 304. The target UE 112 can also send its data to the rest of (or to the subset of) the UEs in the UE-coordination set 304 to enable those other UEs to assist in the transmission of the data for the target UE 112 to the base station 120.

Example Procedures

Example methods 400, 500, 600, and 700 are described with reference to FIG. 4, FIG. 5, FIG. 6, and FIG. 7 in accordance with one or more aspects of a UE-coordination set for a wireless network. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
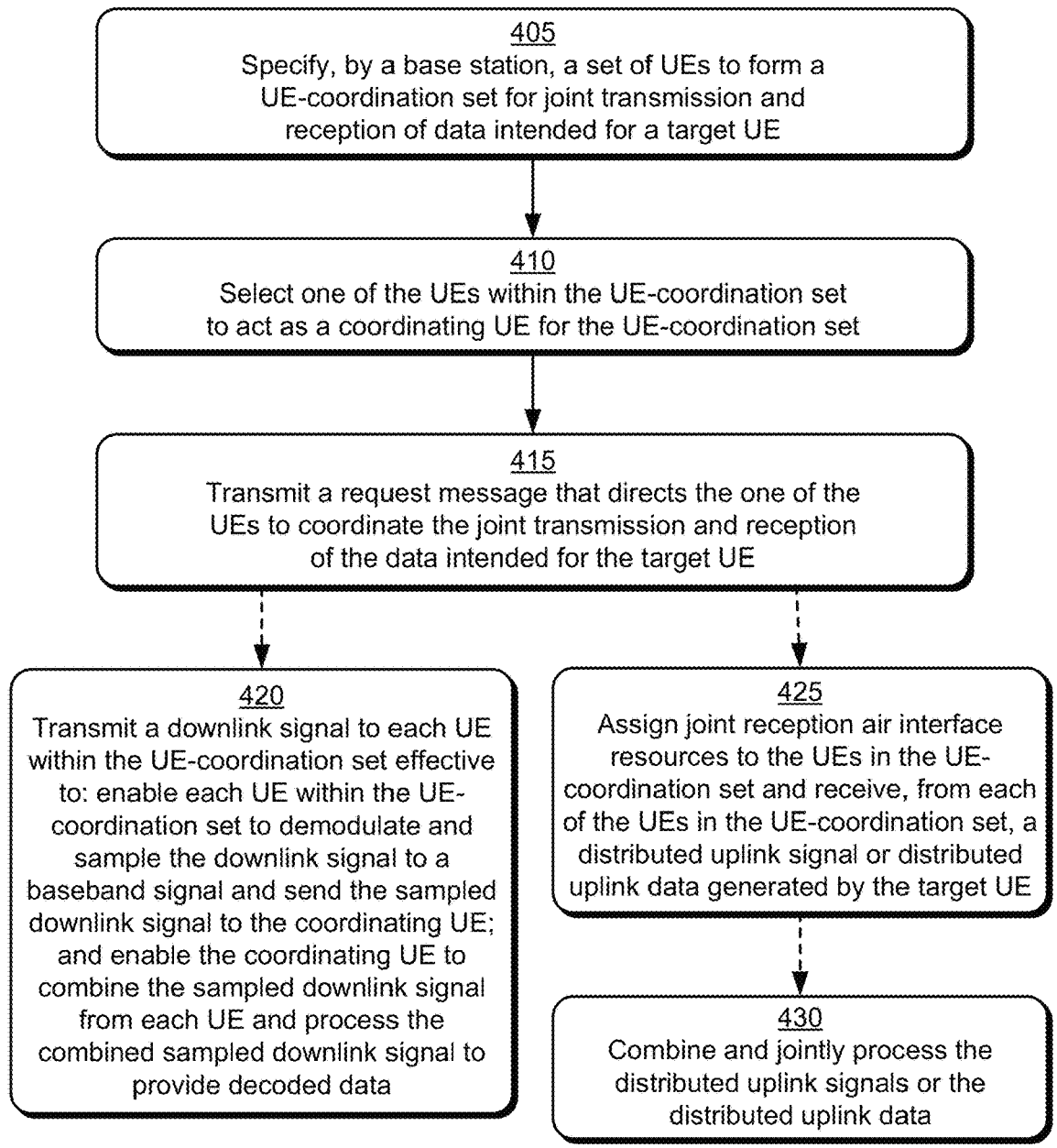
FIG. 4 describes an example method for performing aspects of aspects of a UE-coordination set for a wireless network.

FIG. 4 describes an example method 400 in accordance with one or more aspects of a UE-coordination set for a wireless network. In some implementations, the example method 400 is performed by a base station, such as any one of the base stations 120 of FIG. 1.

At 405, the base station specifies a set of UEs to form the UE-coordination set for joint transmission and reception of data intended for a target UE. For example the base station (e.g., base station 120) specifies the set of UEs (e.g., the set of UEs 110) for joint transmission and reception of data intended for the target UE (e.g., UE 112). The UE-coordination set may be specified to include the target UE and at least one other UE. The base station 120 specifies the set of UEs based on a geographical distance between the target UE (UE 112) and the at least one other UE being less than a predefined distance threshold. Alternatively or in addition, the base station 120 specifies the set of UEs based on spatial beams or timing advance associated with each UE. In aspects, the base station may send an indication to each UE in the UE-coordination set that informs the UEs of the formation of the UE-coordination set. In addition, the indication may include an identifier of one or more additional UEs in the UE-coordination set, such as the target UE or a coordinating UE of the UE-coordination set, and other information helpful to forming the UE-coordination set such as security information and local wireless network information.

At 410, the base station selects one of the UEs in the UE-coordination set to act as a coordinating UE (e.g., master UE) for the UE-coordination set to coordinate transmissions among the UEs in the UE-coordination set. As one example, the base station 120 selects the one UE (UE 111) as the coordinating UE based on various factors, including a processing power, a battery-level state, a capability, a permission, or a location of the coordinating UE. In aspects, the coordinating UE is the target UE. Alternatively, the coordinating UE is a UE different from the target UE within the UE-coordination set.

At 415, the base station transmits a request message (e.g., a configuration message) that directs one of the UEs within the UE-coordination set to coordinate the joint transmission and reception of the data intended for the target UE. In at least one example, the base station 120 transmits a signal to each UE 111, 112, 113 in the UE-coordination set 304 to direct each UE 111, 112, 113 to participate in joint reception of downlink data for a target UE in the UE-coordination set, such as by down-converting and sampling an RF signal to determine I/Q baseband signals and then forwarding the baseband I/Q samples to the coordinating UE (UE 111) for joint processing of the data at the coordinating UE.

Optionally, at 420, the base station transmits a downlink signal, intended for the target UE, to each UE within the UE-coordination set. In an example, the downlink signal is transmitted to each of the UEs 111, 112, 113 in the UE-coordination set 304 to enable each of the UEs 111, 112, 113 to receive the downlink signal, demodulate and sample the downlink signal to a baseband signal, and send the sampled downlink signal (e.g., I/Q signals) to the coordinating UE (UE 111). In addition, the coordinating UE is enabled to combine the sampled downlink signal from each UE and process the combined sampled downlink signal to provide decoded data.

Optionally, at 425, the base station assigns joint reception air interface resources to the UEs in the UE-coordination set and receives, from each of the UEs in the UE-coordination set, a distributed uplink signal or distributed uplink data generated by the target UE, as described above.

Then, at 430, the base station combines and jointly processes the distributed uplink signals or the distributed uplink data. The base station 120 can synchronize, demodulate, and decode the combined uplink signals to obtain data packets corresponding to the target UE (UE 112).

Figure 5:
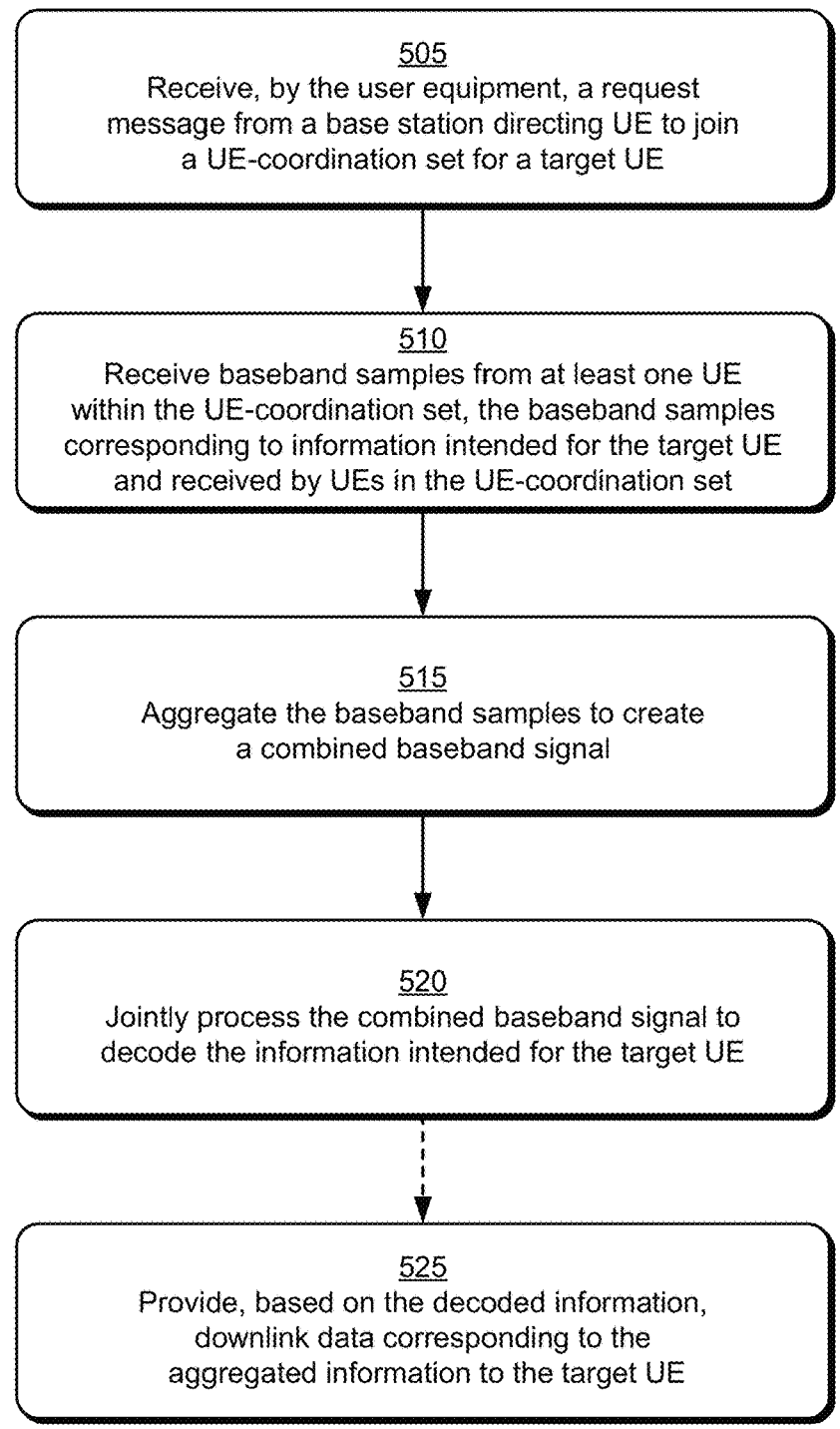
FIG. 5 describes an example method for performing aspects of aspects of a UE-coordination set for a wireless network.

FIG. 5 describes an example method 500 in accordance with one or more aspects of a UE-coordination set for a wireless network. In some implementations, the example method 500 is performed by a coordinating UE in a wireless communications network. This coordinating UE may be UE 111 as previously described.

At 505, the UE receives an upper-layer message from a base station indicating a formation of a UE-coordination set including the UE. In aspects, the UE-coordination set defines multiple UEs that are configured to act as a distributed antenna for a target UE in the UE-coordination set. The indication may include an identifier of each of the multiple UEs included in the UE-coordination set to enable the UE to coordinate the joint reception and transmission of the data intended for the target UE. In aspects, the upper-layer message may indicate that the UE is to coordinate aggregation of downlink signals that are intended for the target UE and received by the UEs in the UE-coordination set and sent to the UE.

At 510, the UE receives baseband samples from at least one UE within the UE-coordination set. The baseband samples correspond to information intended for the target UE and received by the at least one UE. The UE can receive the baseband samples from the other UEs in the UE-coordination set using its local wireless network transceiver 210 in a local wireless network 306.

At 515, the UE aggregates the baseband samples to create a combined baseband signal. Any suitable aggregation process may be implemented to aggregate the baseband samples received from the other UEs in the UE-coordination set.

At 520, the UE processes the combined (e.g., aggregated) baseband samples to decode the information intended for the target UE. An example of processing the baseband samples is described above.

Optionally, at 525, the UE provides downlink data corresponding to the information to the target UE. In aspects, the UE forwards the downlink data to the target UE using a local wireless network 306. If the UE is the coordinating UE for the UE-coordination set, then the UE forwards the decoded downlink data to the target UE. However, if the UE is the target UE, then the UE does not forward the decoded downlink data to another UE.

Figure 6:
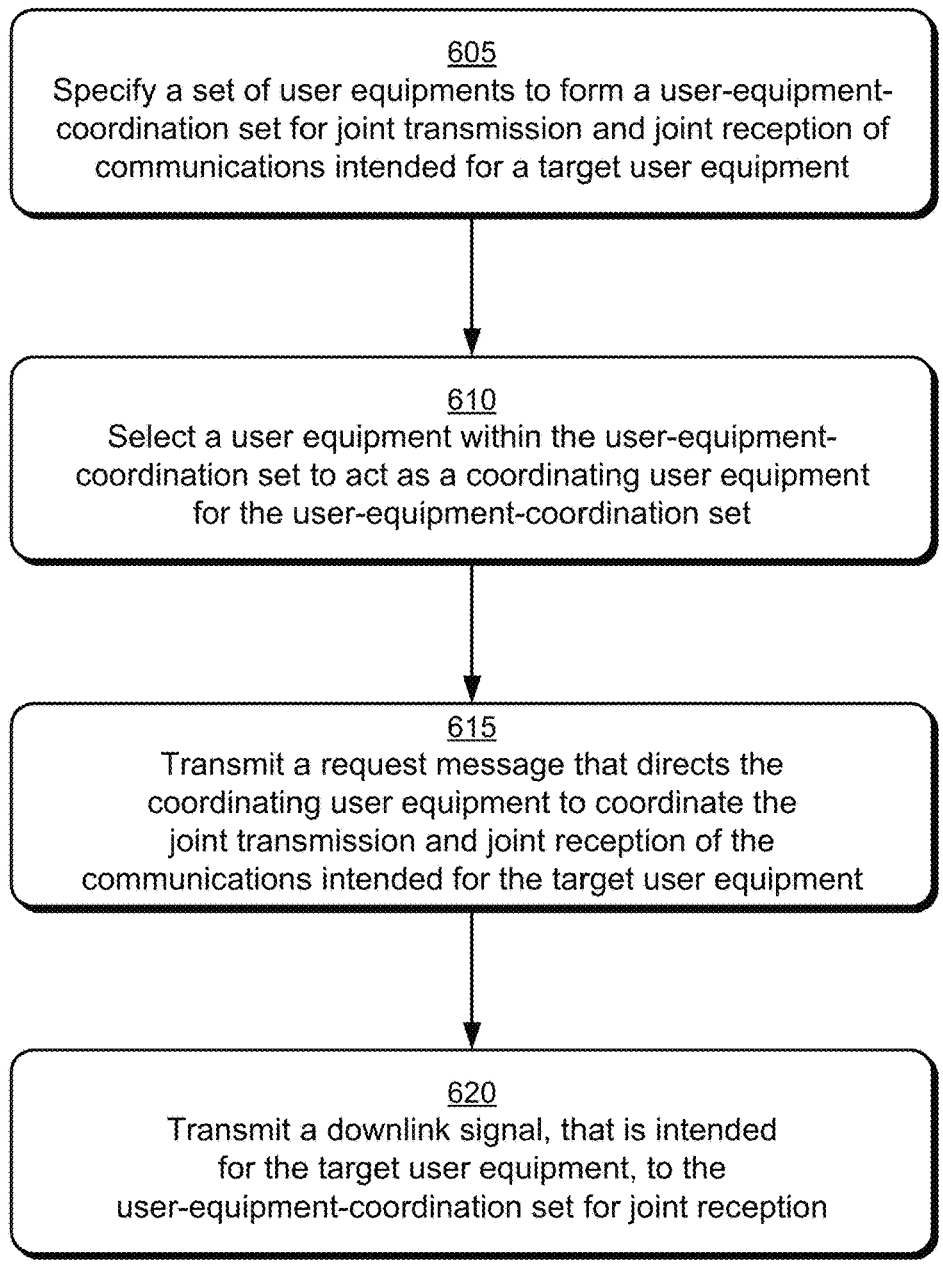
FIG. 6 describes an example method for performing aspects of aspects of a UE-coordination set for a wireless network.

FIG. 6 describes an example method 600 in accordance with one or more aspects of a UE-coordination set for a wireless network. In some implementations, the example method 600 is performed by a base station, such as any one of the base stations 120 of FIG. 1.

At 605, the base station specifies a set user equipments to form a user-equipment-coordination set (UE-coordination set) for joint transmission and/or joint reception of communications intended for a target user equipment. For example, the base station (e.g., base station 120) specifies the UE-coordination set (e.g., set 110) to include the target user equipment (e.g., UE 112) and at least one other user equipment (e.g., UE 111, UE 113). In some implementations, the base station specifies the set of user equipments to include in the UE-coordination set based on a geographical distance between a first user equipment in the set and a second user equipment in the set being less than a predefined distance threshold, such as the geographical distance between a coordinating user equipment and the second user equipment. Alternately or additionally, the base station specifies the set of user equipments based on one or more spatial beams and/or one or more timing advances. For example, the base station specifies the set of user equipments by selecting user equipments within a threshold distance of a particular UE such that the user equipments are located in the same beam or beams that are close to each other. As another example, a timing advance may indicate a distance between a UE and the base station, and the base station specifies the set of user equipments based on one or more timing advances for each user equipments in a group that indicates which user equipments that are approximately the same distance from the base station.

In specifying the set of user equipments, the base station sometimes transmits an indication to each user equipment of the set of user equipments that directs the respective user equipment to join the UE-coordination set. At times, the indication includes an identifier of one or more additional user equipments assigned to the UE-coordination set. In various implementations, and in response to transmitting the indication(s), the base station receives at least two response messages from the set of user equipments, where each response message acknowledges that a respective user equipment of the set of user equipments has joined the UE-coordination set.

At 610, the base station selects a user equipment within the UE-coordination set to act as a coordinating user equipment for the UE-coordination set. For example, the base station (e.g., base station 120) selects the user equipment (e.g., UE 111) to act as the coordinating user equipment based on one or more characteristics of the user equipment, such as any combination of a processing power, a battery-level state, a capability, or a location.

At 615, the base station transmits a request message that directs the coordinating user equipment to coordinate the joint transmission and/or joint reception of the communications intended for the target user equipment. For example, the base station (e.g., base station 120) transmits a coordination message to the coordinating user equipment (e.g., UE 111) to request that the user equipment act as the coordinating user equipment for the UE-coordination set.

At 620, the base station transmits a downlink signal, that is intended for the target user equipment, to the UE-coordination set for joint reception. As one example, the base station (e.g., base station 120) sends a same signal to each user equipment within the user-equipment-coordination set (e.g., set 110), such as a beamformed signal that reaches each of the user equipments within the UE-coordination set based on the user equipments being specified based on respective locations.

While the base station transmits a downlink signal, in alternate or additional implementations, the base station receives uplink signals from user equipments in the UE-coordination set. For instance, in one or more implementations, the base station receives, from a first user equipment in the UE-coordination set, a first signal based on a distributed uplink signal generated by the target user equipment that includes uplink information. Similarly, the base station receives, from a second user equipment in the UE-coordination set t, a second signal based on the distributed uplink signal. The base station then combines the first signal and the second signal to generate a combined uplink signal, and processes the combined uplink signal to obtain uplink information from the targeted user equipment.

Figure 7:
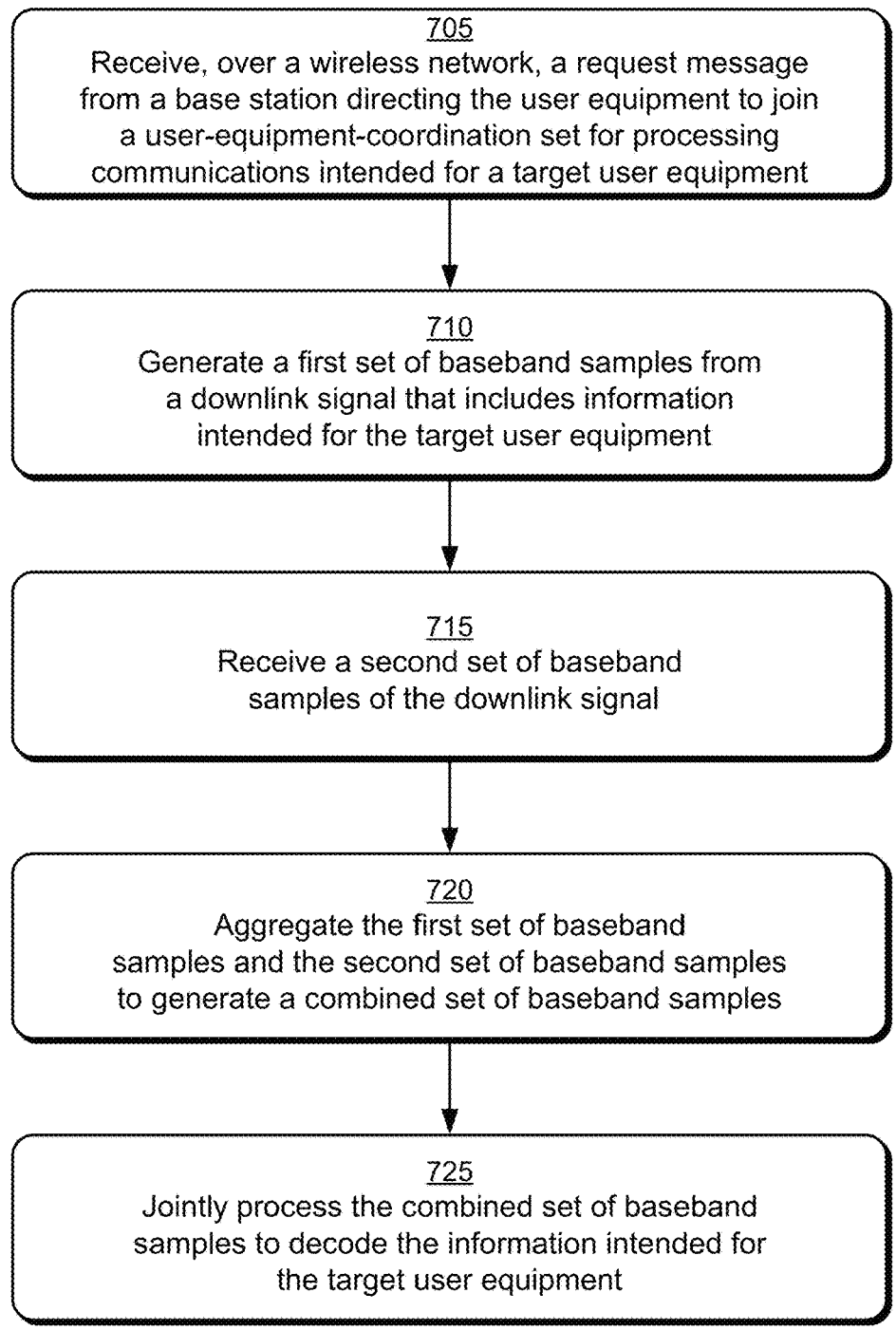
FIG. 7 describes an example method for performing aspects of aspects of a UE-coordination set for a wireless network.

FIG. 7 describes an example method 700 in accordance with one or more aspects of a UE-coordination set for a wireless network. In some implementations, the example method 700 is performed by a user equipment in a wireless communications network. For instance, the user equipment can, at times, correspond to a coordinating user equipment (e.g., UE 111) and/or a target user equipment (e.g., UE 112).

At 705, a user equipment receives, over a wireless network, a request message from a base station directing the user equipment to join a UE-coordination set for processing communications intended for a target user equipment. For instance, the user equipment (e.g., UE 111, UE 112, UE 113) receives an indication from the base station (e.g., 120), where the indication includes an identifier of one or more additional user equipments assigned to the UE-coordination set. The user equipment, at times, is the target user equipment, while other times, the user equipment is different from the target user equipment. In some implementations, the request message includes information, such as the identifier of each user equipment, that enables the user equipment to communicate with other user equipments using a local wireless network that is different from the wireless network used to communicate with the base station.

At 710, the user equipment generates a first set of baseband samples from a downlink signal that includes information intended for the target user equipment. As one example, the user equipment (e.g., UE 111, UE 112, UE 113) demodulates a downlink (RF) signal from the base station to generate baseband I/Q analog signals. The user equipment then samples the baseband I/Q analog signals to produce the first set of baseband samples. At times, the user equipment also generates system timing information with the first set of baseband samples (e.g., SFN).

At 715, the user equipment receives, from at least one user equipment within the UE-coordination set and over a local wireless network, a second set of baseband samples of the downlink signal. For example, the user equipment (e.g., UE 111, UE 112, UE 113) receives a second set of baseband samples over the local wireless network (e.g., local wireless network 306), where the second set of baseband samples correspond to samples of baseband I/Q analog signals generated by at least the one other user equipment from the downlink signal.

At 720, the user equipment aggregates the first set of baseband samples and the second set of baseband samples to generate a combined set of baseband samples. For instance, the user equipment (e.g., UE 111, UE 112, UE 113) receives timing information with the second set of baseband samples, and uses the timing information to aggregate the first set of baseband samples and the second set of baseband samples. While described as aggregating two sets of samples, the aggregating can combine more sets of samples generated by, and received from, additional user equipments in the UE-coordination set.

At 725, the user equipment jointly processes the combined set of baseband samples to decode the information intended for the target user equipment. For example, the user equipment (e.g., UE 111, UE 112, UE 113) processes the combined set of baseband samples to generate data packets that include the decoded information. In implementations where the user equipment is different from the target user equipment, some implementations forward data packets that include the information to the target user equipment using the local wireless network.

In some implementations, the user equipment determines to transfer joint processing responsibilities to a second user equipment in the UE-coordination set, such as based on any combination of a processing power, a battery level, and/or a geographic location. To illustrate, the user equipment (e.g., UE 111, UE 112, UE 113) determines that a battery level of the second user equipment is higher relative to a battery level of the user equipment. As another example, the user equipment determines that a change in location of the second user equipment positions the second user equipment more geographically central to the UE-coordination set relative to the user equipment. The user equipment then transfers the joint processing responsibilities to the second user equipment.

Alternately or additionally, in various implementations, the user equipment receives, using the local wireless network, an uplink signal from the target user equipment, and directs multiple user equipments in the UE-coordination set to transmit a replication of the uplink signal to the base station. For example, the user equipment (e.g., UE 111, UE 113) receives the uplink signal from the target user equipment (e.g., UE 112) over the local wireless network (e.g., 306).

Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following, several examples are described:

Example 1

A method for using a user-equipment-coordination set by a base station, the method comprising the base station: specifying a set of user equipments to form the user-equipment-coordination set for joint transmission and/or joint reception of communications intended for a target user equipment, the user-equipment-coordination set specified to include the target user equipment and at least one other user equipment; selecting a user equipment within the user-equipment-coordination set to act as a coordinating user equipment for the user-equipment-coordination set; transmitting a request message that directs the coordinating user equipment to coordinate the joint transmission and/or joint reception of the communications intended for the target user equipment; and transmitting a downlink signal, that is intended for the target user equipment, to the user-equipment-coordination set for joint reception.

Example 2

The method as recited in example 1, wherein the transmitting the downlink signal comprises sending a same signal to each user equipment within the user-equipment-coordination set.

Example 3

The method as recited in example 2, wherein the same signal is a beamformed signal.

Example 4

The method as recited in any one of examples 1 to 3, wherein the selecting the user equipment to act as the coordinating user equipment for the user-equipment-coordination set is based on at least one of a processing power, a battery-level state, a capability, or a location of the coordinating user equipment.

Example 5

The method as recited in any one of examples 1 to 4, wherein the coordinating user equipment is a first user equipment of the user-equipment-coordination set, and wherein the specifying the set of user equipments is based, at least in part, on a geographical distance between the coordinating user equipment and at least a second user equipment of the set of user equipments being less than a predefined distance threshold.

Example 6

The method as recited in any one of examples 1 to 5, wherein the specifying the set of user equipments is based, at least in part, on at least one of: one or more spatial beams associated with the set of user equipments; or one or more timing advances associated with the set of user equipments.

Example 7

The method as recited in any one of examples 1 to 6, further comprising: transmitting, to each user equipment of the set of user equipments, an indication that directs each user equipment to join the user-equipment-coordination set; and receiving at least two response messages from the set of user equipments, each response message acknowledging that a respective user equipment of the set of user equipments has joined the user-equipment-coordination set.

Example 8

The method as recited in any one of examples 1 to 7, further comprising: receiving, from a third user equipment in the user-equipment-coordination set, a first signal based on a distributed uplink signal generated by the target user equipment that includes uplink information; receiving, from a fourth user equipment in the user-equipment-coordination set, a second signal based on the distributed uplink signal; combining the first signal and the second signal to generate a combined uplink signal; and processing the combined uplink signal to obtain uplink information from the targeted user equipment.

Example 9

The method as recited in any one of examples 1 to 8, wherein the specifying the set of user equipments further comprises: transmitting an upper-protocol-layer message to each user equipment in the user-equipment-coordination set that directs each user equipment to join the user-equipment-coordination set.

Example 10

The method as recited in example 9, wherein the upper-protocol-layer message that directs the user equipment to join the user-equipment-coordination set comprises one of: a Media Access Control layer message; or a Service Data Adaptation Protocol layer message.

Example 11

The method as recited in example 9 or example 10, wherein the upper-protocol-layer message includes at least one of: security information; local wireless network information; or an identity of the coordinating user equipment.

Example 12

The method as recited in any one of examples 1 to 11, wherein the coordinating user equipment is a first user equipment in the user-equipment-coordination set, and the method further comprises: determining to modify the coordinating user equipment based on one or more factors associated with the user-equipment-coordination set; identifying a second user equipment in the user-equipment-coordination set; and directing the second user equipment to be the coordinating user equipment.

Example 13

The method as recited in example 12, wherein the one or more factors comprise one or more of: a battery-level state of at least one user equipment in the user-equipment-coordination set; a processing power of at least one user equipment in the user-equipment-coordination set; or an updated location of at least one user equipment in the user-equipment-coordination set.

Example 14

The method as recited in any one of examples 1 to 13, further comprising: receiving, from the user equipment, a response message that indicates the request message has been approved by a user.

Example 15

A method performed by a user equipment in a wireless network, the method comprising: receiving, by the user equipment and over the wireless network, a request message from a base station directing the user equipment to join a user-equipment-coordination set for processing communications intended for a target user equipment; generating a first set of baseband samples from a downlink signal that includes information intended for the target user equipment; receiving, from at least one user equipment within the user-equipment-coordination set and over a local wireless network, a second set of baseband samples of the downlink signal; aggregating the first set of baseband samples and the second set of baseband samples to generate a combined set of baseband samples; and jointly processing the combined set of baseband samples to decode the information intended for the target user equipment.

Example 16

The method as recited in example 15, wherein the receiving the request message further comprises: receiving an indication that includes an identifier for each user equipment in the user-equipment-coordination set; and using the identifier to communicate with each user equipment over the local wireless network.

Example 17

The method as recited in any one of examples 15 or example 16, wherein the aggregating at least the first set of baseband samples and the second set of baseband samples comprises: receiving timing information with the second set of baseband samples; and using the timing information to aggregate at least the first set of baseband samples and the second set of baseband samples.

Example 18

The method as recited in any one of examples 15 to 17, wherein the user equipment is different from the target user equipment.

Example 19

The method as recited in example 18, wherein the user equipment is a first user equipment in the user-equipment-coordination set, the method further comprising: determining to transfer joint processing responsibilities to a second user equipment in the user-equipment-coordination set; and transferring the joint processing responsibilities to the second user equipment.

Example 20

The method as recited example 18 or example 19, further comprising: receiving, using the local wireless network, an uplink signal from the target user equipment; and directing, using the local wireless network, multiple user equipments in the user-equipment-coordination set to transmit a replication of the uplink signal to the base station.

Example 21

The method as recited in any one of examples 15 to 17, wherein the user equipment is the target user equipment.

Example 22

The method as recited in any one of examples 18 to 20, further comprising: forwarding data packets that include the information to the target user equipment using the local wireless network.

Example 23

The method as recited in any one of examples 15 to 22, wherein the first set of baseband samples and the second set of baseband samples include samples of in-phase and quadrature components of the downlink signal.

Example 24

The method as recited in any one of examples 13 to 23, wherein the receiving the request message to join the user-equipment-coordination set comprises: receiving an upper-protocol-layer message that comprises one of: a Media Access Control layer message; or a Service Data Adaptation Protocol layer message.

Example 25

A base station apparatus comprising: a wireless transceiver; a processor; and computer-readable storage media comprising instructions, responsive to execution by the processor, for directing the base station apparatus to perform any one of the methods of examples 1 to 14, 27, or 28.

Example 26

A user equipment apparatus comprising: a wireless transceiver; a processor; and computer-readable storage media comprising instructions, responsive to execution by the processor, for directing the user equipment apparatus to perform any one of the methods of examples 15 to 24, 28, or 29.

Example 27

A method for using a user-equipment-coordination set by a base station, the method comprising the base station: specifying a set of user equipments to form the user-equipment-coordination set for joint transmission and/or joint reception of communications intended for a target user equipment, the user-equipment-coordination set specified to include the target user equipment and at least one other user equipment; selecting a user equipment within the user-equipment-coordination set to act as a coordinating user equipment for the user-equipment-coordination set; transmitting a request message that directs the coordinating user equipment to coordinate the joint transmission and/or joint reception of the communications intended for the target user equipment; receiving, from a first user equipment in the user-equipment-coordination set, a first signal based on a distributed uplink signal generated by the target user equipment that includes uplink information; receiving, from a second user equipment in the user-equipment-coordination set, a second signal based on the distributed uplink signal; combining the first signal and the second signal to generate a combined uplink signal; and processing the combined uplink signal to obtain uplink information from the targeted user equipment.

Example 28

The method of example 27, further comprising any of the features of any of examples 1 to 14.

Example 29

A method performed by a user equipment in a wireless network, the method comprising: receiving, by the user equipment and over the wireless network, a request message from a base station directing the user equipment to join a user-equipment-coordination set for processing communications from a target user equipment; transmitting uplink data to at least one other user equipment in the user equipment-coordination set via a local wireless network; and transmitting the uplink data to the base station at the same time as the uplink data is transmitted to the base station by the at least one other user equipment.

Example 30

The method of example 30, further comprising any of the features of any of examples 15 to 24

CONCLUSION

Although techniques and devices for a UE-coordination set for a wireless network have been described in language specific to features and/or methods, it is to be understood that the subject of the appended claims is not necessarily limited to the specific features or methods described. Rather, the specific features and methods are disclosed as example implementations of a UE-coordination set for a wireless network.

What is claimed is:

1. A method for using a user-equipment-coordination set (UECS) by a base station, the method comprising the base station:
specifying a set of user equipments (UEs) to form the user-equipment-coordination set for joint transmission and joint reception of communications intended for a target user equipment, the user-equipment-coordination set specified to include the target user equipment and at least one other user equipment;
selecting a user equipment within the user-equipment-coordination set to act as a coordinating user equipment for the user-equipment-coordination set;
transmitting a request message that directs the coordinating user equipment to coordinate the joint transmission and joint reception of the communications intended for the target user equipment; and
transmitting a downlink signal, that is intended for the target user equipment, to the user-equipment-coordination set for joint reception, by multiple UEs in the UECS, by sending a same signal to each user equipment within the user-equipment-coordination set.

2. The method as recited in claim 1, wherein the transmitting the downlink signal comprises:
transmitting user data intended for the target user equipment using the downlink signal.

3. The method as recited in claim 1, wherein the same signal is a beamformed signal.

4. The method as recited in claim 1, wherein the selecting the user equipment to act as the coordinating user equipment for the user-equipment-coordination set is based on at least one of a processing power, a battery-level state, a capability, or a location of the coordinating user equipment.

5. The method as recited in claim 1, wherein the specifying the set of user equipments is based, at least in part, on at least one of:
one or more spatial beams associated with the set of user equipments; or
one or more timing advances associated with the set of user equipments.

6. The method as recited in claim 1, further comprising:
transmitting, to each user equipment of the set of user equipments, an indication that directs each user equipment to join the user-equipment-coordination set; and
receiving at least two response messages from the set of user equipments, each response message acknowledging that a respective user equipment of the set of user equipments has joined the user-equipment-coordination set.

7. The method as recited in claim 1, further comprising:
receiving, from a third user equipment in the user-equipment-coordination set, a first signal based on a distributed uplink signal generated by the target user equipment that includes uplink information;
receiving, from a fourth user equipment in the user-equipment-coordination set, a second signal based on the distributed uplink signal;
combining the first signal and the second signal to generate a combined uplink signal; and
processing the combined uplink signal to obtain uplink information from the targeted user equipment.

8. A base station apparatus comprising:
a wireless transceiver;
a processor; and
computer-readable storage media comprising instructions, responsive to execution by the processor, for directing the base station apparatus to perform operations comprising:
specifying a set of user equipments (UEs) to form a user-equipment-coordination set (UECS) for joint transmission and joint reception of communications intended for a target user equipment, the user-equipment-coordination set specified to include the target user equipment and at least one other user equipment;
selecting a user equipment within the user-equipment-coordination set to act as a coordinating user equipment for the user-equipment-coordination set;
transmitting a request message that directs the coordinating user equipment to coordinate the joint transmission and joint reception of the communications intended for the target user equipment; and
transmitting a downlink signal, that is intended for the target user equipment, to the user-equipment-coordination set for joint reception, by multiple UEs in the UECS, by sending a same signal to each user equipment within the user equipment-coordination set.

9. The base station apparatus as recited in claim 8, wherein the computer-readable storage media comprises instructions that direct the base station apparatus to transmit the downlink signal by:
transmitting user data intended for the target user equipment using the downlink signal.

10. The base station apparatus as recited in claim 8, wherein the computer-readable storage media comprises instructions that direct the base station apparatus to transmit the same signal by:
transmitting a beamformed a beamformed signal.

11. The base station apparatus as recited in claim 8, wherein the computer-readable storage media comprises instructions that direct the base station apparatus to select the user equipment to act as the coordinating user equipment by:
selecting the user equipment to act as the coordinating user equipment for the user-equipment-coordination set based on at least one of a processing power, a battery-level state, a capability, or a location of the coordinating user equipment.

12. The base station apparatus as recited in claim 8, wherein the computer-readable storage media comprises instructions that direct the base station apparatus to specify the set of user equipments by:
specifying the set of user equipments is based, at least in part, on at least one of:
one or more spatial beams associated with the set of user equipments; or
one or more timing advances associated with the set of user equipments.

13. The base station apparatus as recited in claim 8, wherein the computer-readable storage media comprises instructions that direct the base station apparatus to perform further operations comprising:

transmitting, to each user equipment of the set of user equipments, an indication that directs each user equipment to join the user-equipment-coordination set; and receiving at least two response messages from the set of user equipments, each response message acknowledging that a respective user equipment of the set of user equipments has joined the user-equipment-coordination set.

14. The base station apparatus as recited in claim 8, wherein the computer-readable storage media comprises instructions that direct the base station apparatus to perform further operations comprising:

receiving, from a third user equipment in the user-equipment-coordination set, a first signal based on a distributed uplink signal generated by the target user equipment that includes uplink information;

receiving, from a fourth user equipment in the user-equipment-coordination set, a second signal based on the distributed uplink signal;

combining the first signal and the second signal to generate a combined uplink signal; and processing the combined uplink signal to obtain uplink information from the targeted user equipment.

\* \* \* \* \*